United States Patent [19]
Smith

[11] Patent Number: 6,152,338
[45] Date of Patent: Nov. 28, 2000

[54] LONG GUN SUPPORT SYSTEM

[76] Inventor: Patrick D. Smith, 16036 W. Ellsworth La., Golden, Colo. 80401

[21] Appl. No.: 09/032,427

[22] Filed: Feb. 27, 1998

[51] Int. Cl.[7] ................. A45F 5/00; F41C 33/02
[52] U.S. Cl. ............ 224/149; 224/153; 224/250; 224/259; 224/627; 224/649; 224/651; 224/675; 224/913
[58] Field of Search ................ 224/149, 150, 224/153, 191, 200, 627, 637, 638, 645, 646, 649, 650, 651, 250, 251, 259, 262, 913, 674, 675, 660, 663, 665, 625, 626, 583

[56] References Cited

U.S. PATENT DOCUMENTS

| | | |
|---|---|---|
| 745,866 | 12/1903 | Laing ............................ 224/913 X |
| 919,301 | 4/1909 | Anderson . |
| 1,275,862 | 8/1918 | Danz . |
| 2,536,252 | 1/1951 | Bates . |
| 2,576,559 | 11/1951 | Bennek ............................ 224/149 |
| 2,647,667 | 8/1953 | Brown et al. . |
| 2,940,651 | 6/1960 | Wilson et al. ................ 224/675 X |
| 3,655,106 | 4/1972 | Wojcinski . |
| 3,819,094 | 6/1974 | Hyde . |
| 3,869,074 | 3/1975 | Roach . |
| 3,917,134 | 11/1975 | Tumlinson . |
| 4,057,180 | 11/1977 | Whittaker . |
| 4,751,923 | 6/1988 | Marino ........................... 224/675 X |
| 4,819,845 | 4/1989 | Byrd ............................... 224/250 X |
| 4,903,875 | 2/1990 | Smart et al. ................... 224/149 X |
| 4,964,553 | 10/1990 | Glynn . |
| 5,029,741 | 7/1991 | Easter . |
| 5,092,505 | 3/1992 | Olschlager . |
| 5,240,156 | 8/1993 | Sicotte et al. . |
| 5,325,618 | 7/1994 | Turner ........................... 224/149 X |
| 5,386,932 | 2/1995 | Gross . |
| 5,413,262 | 5/1995 | Dewire et al. .................... 224/675 |
| 5,464,136 | 11/1995 | Eddy ............................... 224/911 X |
| 5,664,721 | 9/1997 | Homeyer ........................ 224/149 X |
| 5,669,170 | 9/1997 | Norris ............................ 224/150 X |
| 5,683,022 | 11/1997 | Evans ................................ 224/583 |

FOREIGN PATENT DOCUMENTS

| | | | |
|---|---|---|---|
| 300306 | 9/1917 | Germany | ............................ 224/913 |

OTHER PUBLICATIONS

Brochure: Nimrod Pack Systems of the Rockies, Cashmere, Washington; as early as Feb., 1998.

Brochure: Gemini Innovations Inc., Willis, Texas; as early as Feb., 1998.

Brochure: Boonie Packer Products, Salem, Oregon; as early as Feb., 1998.

*Primary Examiner*—Gregory M. Vidovich
*Attorney, Agent, or Firm*—Holland & Hart LLP

[57] ABSTRACT

A modular load bearing field support system having a waist belt, a pair of shoulder straps, each of the shoulder straps having a front end attached to the waist belt and a rear end attached to the waist belt, and a middle section disposed between said front and rear ends. A mounting track is attached to said waist belt, and a spatula accessory support system is included for mounting an accessory on the mounting track. The spatula system includes a flat spatula attached to an accessory, with the spatula inserted between the mounting track and the waist belt to attach the accessory to waist belt. A long gun support system for conveniently and safely carrying a firearm along with the load bearing support system is described. Extension panels for carrying large loads on the support system, as well as fabric noise-reduction and color variation panels are also described.

2 Claims, 25 Drawing Sheets

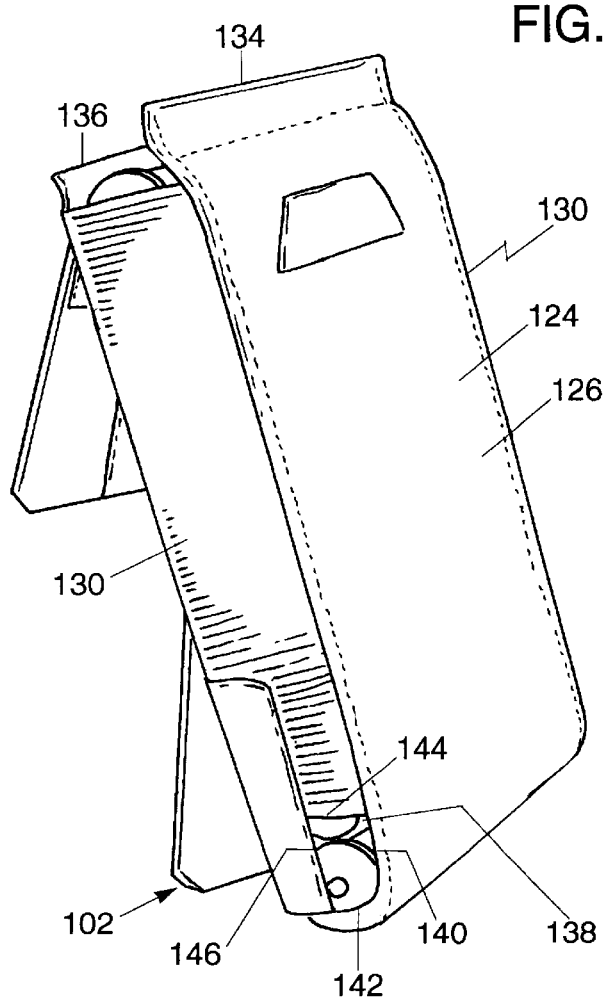
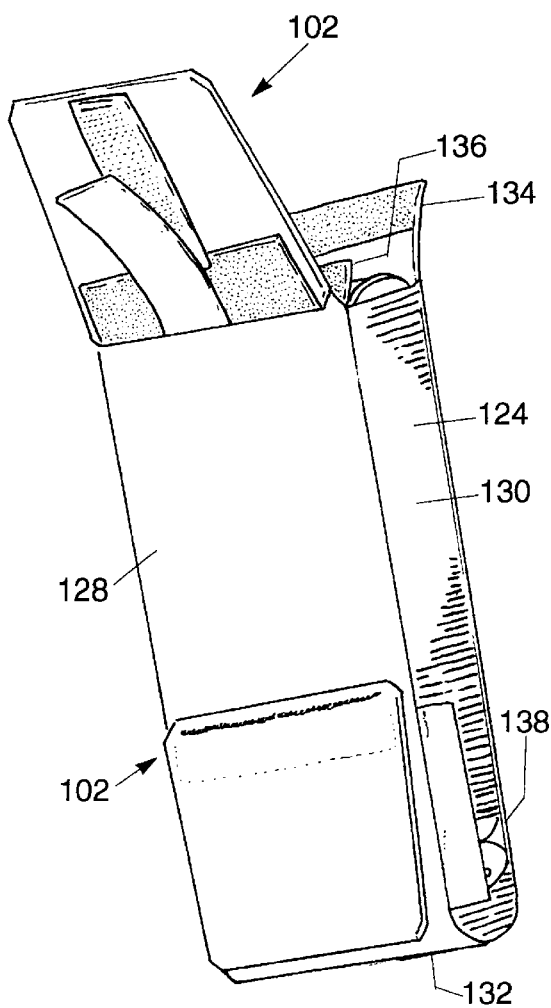
FIG. 7a
FIG. 7b

LONG GUN SUPPORT SYSTEM

FIELD OF THE INVENTION

This invention relates to a modular system for carrying various gear on a person. More specifically, this invention relates to a connection system that allows the modular application of various cargo holders to specialized or generic backpacks or frame harnesses.

BACKGROUND OF THE INVENTION

Load bearing pack systems have been used for years in a variety of roles, including hunting, expedition, camping, military and police activities. The pack systems for each of these activities have developed into specialized designs unique to the particular activity. The pack systems for each activity have to take into consideration several features and requirements specific to each activity. Some of these features and requirements include firearm transportation, camouflage, noise creation, and the need to carry situation-specific accessories.

The primary means of carrying a shoulder arm, such as a rifle, has been a shoulder sling. As firearm use has developed, the shoulder sling has failed to keep up with the needs of modern hunters, police, and military personnel. One reason is that a shoulder sling positions the firearm in an awkward position on a person's back. From this position, the firearm must be swung off the shoulder, brought to the front of the body, and both hands must be repositioned on the firearm before the firearm can be raised to the shoulder for firing. Also, when a shoulder sling is used with any sort of backpack, the positioning of the pack tends to push the sling from the shoulder, especially during any type of brisk movement. With certain types of packs, i.e., those with shoulder lift features, the use of a shoulder sling carried on the shoulder is very inconvenient if not impossible. Using a shoulder sling also make it very difficult to crawl, or use both hands for climbing, especially when combined with a backpack. In addition, the shoulder sling also leaves the rifle unprotected on the user's back, making it vulnerable to bumps and jolts, which can disrupt the optical sighting device, or even more seriously damage the gun.

The use of a shoulder sling also places the entire load of the firearm on the user's shoulder. As firearms become heavier (for enhanced accuracy and reduced recoil), carrying them on a shoulder sling can be uncomfortable, awkward and tiresome, especially when combined with a backpack.

It is critical that both hands are kept free for full freedom of use while keeping the firearm conveniently located for quick use, protecting the optical sighting device, and especially when used in combination with carrying other gear, such as in a backpack.

With respect to load bearing systems, such as backpacks, many are designed for a particular purpose in mind. For instance, for hunting applications, most users have been limited to choosing between a brightly colored or blaze orange backpack and a camouflage backpack. A blaze orange backpack is undesirable where concealment is needed, and camouflage backpack may be undesirable, or illegal in certain hunting situations. Additionally, users have been required to choose between stealth and durability, between reduced noise and weatherproof performance. Backpacks made of strong, weatherproof material such as nylon, are inherently noisy, such as when contacted by foliage. Backpacks made of quiet material, such as pile or fleece, have had to sacrifice durability and foul-weather performance because these "quiet" materials are not as strong or weatherproof as nylon.

The versatility of situation-specific accessories, such as cargo platforms, seats, hand warmers, and add-on pouches have served only a single function, which reduces the versatility of any load carrying device. Certain of these features can be an advantage, depending on the particular activity.

It is with the shortcomings of the prior art in mind that the modular load bearing field support system of the present invention has been developed.

SUMMARY OF THE INVENTION

The present invention includes a load bearing field support system, which can be a specialized harness structure, as described below, or a standard backpack type structure. The load bearing field support system has many components and features which overcome the aforementioned problems.

The present invention includes a load bearing field support system having a waist belt, a pair of shoulder straps, each of the shoulder straps having a front end attached to the waist belt and a rear end attached to the waist belt, and a middle section disposed between said front and rear ends. A mounting track is attached to the waist belt, and a spatula accessory support system is included for mounting an accessory on the mounting track. The spatula accessory support system includes a flat spatula attached to an accessory, with the spatula inserted between the mounting track and the waist belt to attach the accessory to waist belt.

The present invention also includes a long gun support system for supporting a firearm, having a buttstock and a barrel, from a harness having a waist band and a shoulder strap, such as the field support system described above. The long gun support system includes a cradle defining a receptacle suspended from the waist band, and a fastener attached to the shoulder strap above the waist band wherein the cradle receives the buttstock and the fastener receives the barrel.

The present invention also includes a backpack having a main body defining a cavity, the main body having a front wall, a rear wall, a top wall, a bottom wall and opposing sidewalls, and having a top portion and a bottom portion. A pair of shoulder straps are attached to the main body, each extending generally from the top portion to the bottom portion of the front wall. Left and right waist band portions are attached to the main body and extend forwardly from the front wall. A panel extension is included which has a top end and a bottom end, and is pivotally attached at its bottom end to the bottom portion of the main body. A tie strap extends from the top portion of the main body to the top end of the panel extension. The tie strap supports the top end of the panel in the various positions, such as extending forwardly of the back pack, extending rearwardly of the back pack, and collapsing to extend adjacent to the rear wall of the back pack.

The instant invention also entails a backpack including a main body defining a cavity, the main body having a front wall, a rear wall, a top wall, a bottom wall and opposing sidewalls, and having a top portion and a bottom portion. A pair of shoulder straps are attached to the main body, each extending generally from the top portion to the bottom portion of the front wall. Left and right waist band portions are attached to the main body and extend forwardly of the front wall. A supplemental fabric panel is included for covering the rear wall, and means for attaching the fabric panel to the rear wall are included. The fabric panel reduces noise created by contacting the rear wall during use.

The invention also contemplates a hand warmer for use on a garment having laterally spaced members, the hand warmer including a main body having a front wall, a rear wall, a top edge, opposing side edges, and a bottom edge. A recess is formed between front and rear walls, and an opening is formed in each side edge to allow access to the recess. Fastening means are attached to the main body at the intersection of each side edge with the top edge to suspend the hand warmer between the two laterally spaced members.

The load bearing field support system of the present invention described herein provides great flexibility in outfitting the user. The multi-purpose harness with the spatula support system allows the user to carry only what he desires, and in the particular location as desired by the user. The long gun support system as part of the overall support system, provides advantages in carrying the long gun conveniently and safely, while keeping both hands available for use. In addition, the extension panel, as well as the quiet fabric panels, provide additional functionality to the support system overall support system.

A more complete appreciation of the present invention and its scope can be obtained from understanding the accompanying drawings, which are briefly summarized below, the following detailed description of the presently preferred embodiments of the invention, and the appended claims.

BRIEF DESCRIPTION OF THE DRAWINGS

FIG. 7a is a front perspective view of a shell carrier pouch having two vertically spaced spatula systems attached thereto.

FIG. 7b is a rear perspective view of the shell carrier pouch of FIG. 7a.

FIG. 16b shows the corner attachment of the fabric panel on the panel extension of FIG. 16a.

DETAILED DESCRIPTION OF THE PREFERRED EMBODIMENT

The modular load bearing field support system of the present invention includes the application of various cargo carriers to either harness systems, specialized backpacks, or standard backpacks. The support system is also contemplated to include the application of various cargo carriers to vests, lumbar packs, or other types of load bearing outerwear.

Figure 1:
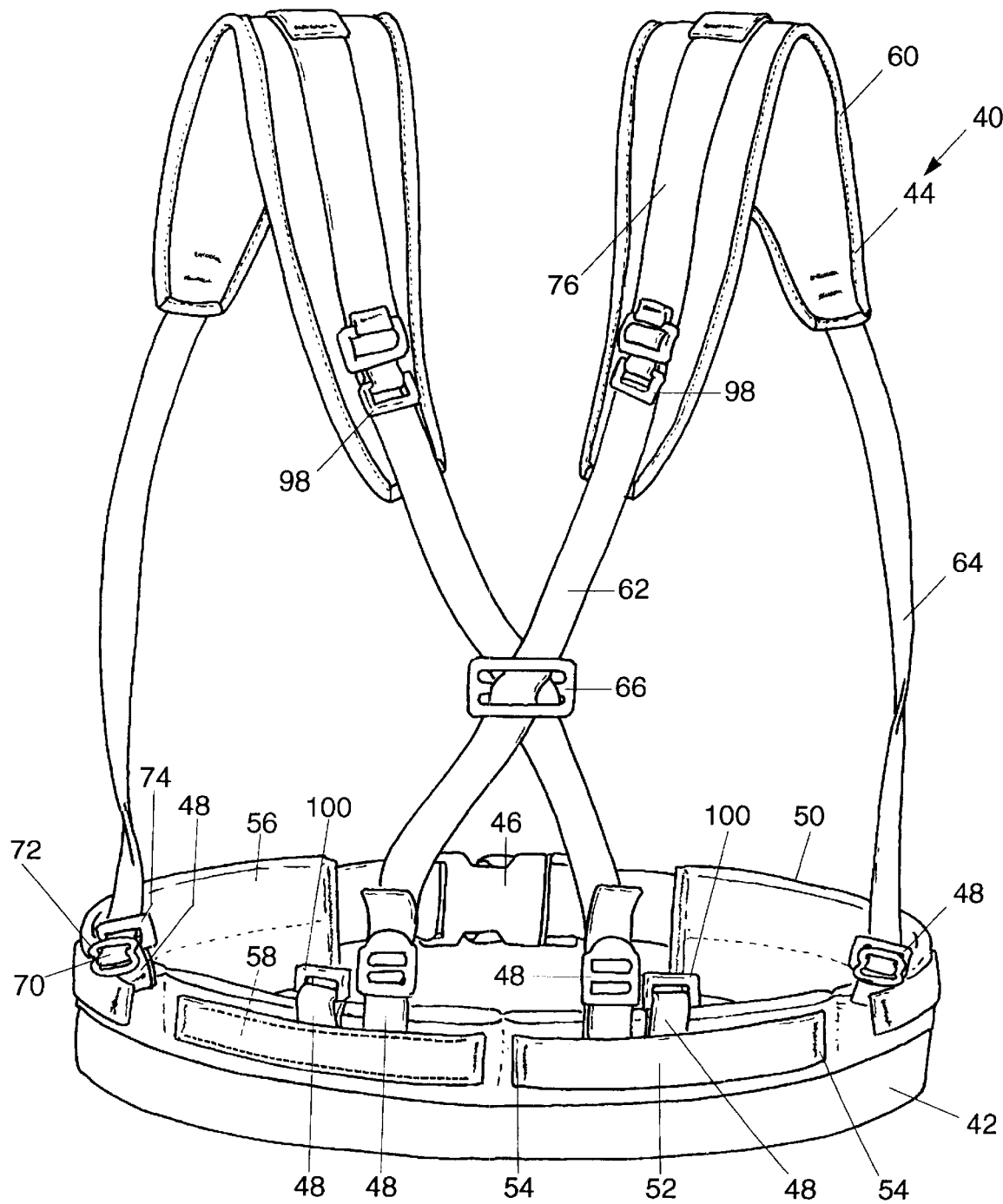
FIG. 1 is a rear view of the harness portion of the load bearing field support system of the present invention.
Figure 2:
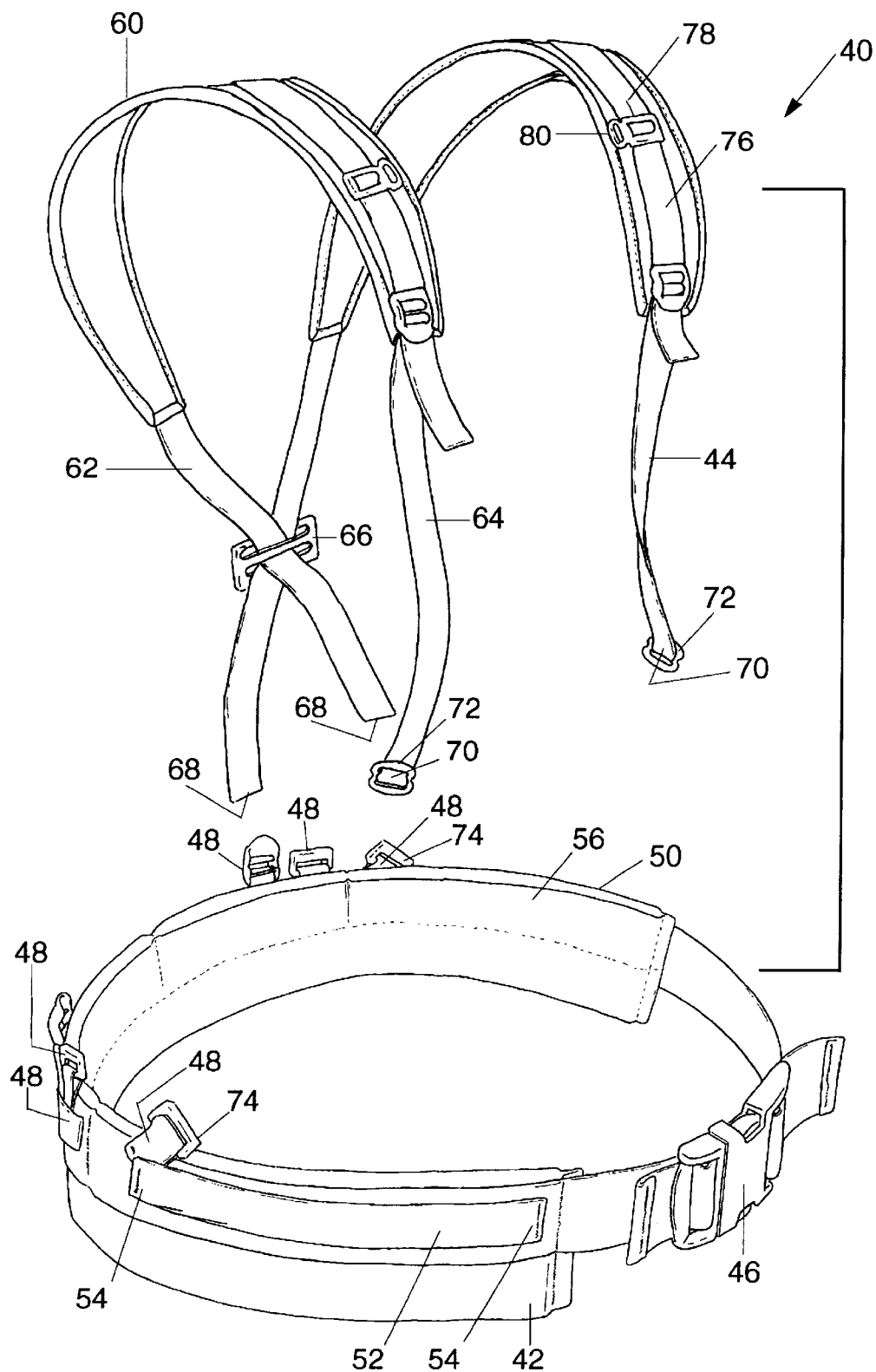
FIG. 2 is an exploded view of the harness of FIG. 1, with the shoulder straps separated from the waist belt.

A support system 40 of the present invention is shown in FIGS. 1 and 2. The support system is effectively a harness worn by a user. The harness is a modular carry system that includes attachment points for securing accessories, many of which are described below. The harness includes a waist belt 42 in conjunction with shoulder straps 44. The waist belt 42 is preferably a padded elongated member having free ends, each end having a matching releasable fastener, such as a quick-release buckle 46. The quick-release buckle also includes a means for adjusting the length of the waist belt 42, such as by extracting or retracting excess waist belt length.

The waist belt 42 fastens around the waist of a user, and can be adjusted in length to fit the waist of the particular user.

The waist belt 42 includes a plurality of attachment points 48 positioned along its top edge 50. The attachment points 48 are used to secure either the shoulder straps 44 or other accessories to the waist band 42. The attachment points 48 are preferably common loop attachments, three-bar sliders, or ladder locks as required for the particular application. A suitable ladder lock is the standard Mojave™ Curved Release by National Molding.

A series of nylon webbing lengths 52 are attached to the outside of the waist belt 42. The nylon webbing lengths 52 are attached to the waist belt only at their opposing ends 54. The nylon webbing lengths 52 are preferably positioned along the top half 56 of the waist belt, for purposes described later. The nylon webbing lengths can be positioned anywhere along the length of the waist belt, such as on either side of the buckle 46 (over a user's hips), or as two separate sections opposite the buckle. The nylon webbing lengths 52 act as mounting tracks for various pieces of gear, cargo and accessories, and as such are securely fastened to the waist belt. The mounting tracks 52 should be relatively taut between the opposing ends 54 attached to the waist belt. The mounting tracks have a releasable fastener 58, such as Velcro® material (either hook or loop, as desired) attached to the inner surface of the mounting track 52 facing the waist belt 42. Reference is made throughout to Velcro® fasteners. It is contemplated that any hook and loop type releasable fastener can be used, but for convenience, such fasteners are referred to as Velcro® fasteners.

The shoulder straps 44 which attach to the waist belt 42 to form the harness system 40 are two substantially identical shoulder straps, each having padded shoulder sections 60, an adjustable-length rear extension 62 from the shoulder section, and an adjustable length front extension 64 from the shoulder section. The rear extension 62 and front extension 64 are preferably nylon webbing, and are adjustable by any known means from the padded section, such as by a ladder lock. The rear extensions 62 are positioned through a three-bar 66 slider and criss-cross before attaching to the waist belt 42. The free rear ends 68 of the rear extensions attach to the ladder lock attachment points 48 on the waist belt 42. This adjustably anchors the shoulder straps 44 to the rear of the waist belt 42. The free front ends 70 of the front extension terminate in three bar sliders 72. These three-bar sliders then fit length wise through the common loop 74 attachments 48 on the waist belt 42, and are retained in the common loop 74 so they cannot be extracted without being oriented lengthwise to fit back through the common loop 74. In this way the shoulder straps 44 are attached to the waist belt 42 to form the harness 40. The common loop and three-bar slider attachment structure is described in more detail with respect to FIG. 3b below.

Mounting tracks 76 are positioned on the shoulder straps 44, preferably on the padded portion 60, to support attachment structures 78, such as a three-bar slider having an integrally-formed laterally extending common loop 80. The mounting tracks 76 are analogous to those mounted on the waist belt 42. The attachment structures 78, discussed in more detail below, allow accessories to be attached to each strap 44 individually, or between the shoulder straps 44. The harness 40 is light-weight, simple to adjust, and can carry a variety of accessories attached to the various attachment points 48, 78, as are described below. The flexibility of the system allows the user to attach only the desired gear. It is contemplated that the mounting tracks 52, 76 could be attached to the waist belt or shoulder strap, if proper, of any load carrying device, including a backpack, vest or lumbar pack. The benefits of the various features of the attachment system described herein benefit all such applications.

Figure 3A:
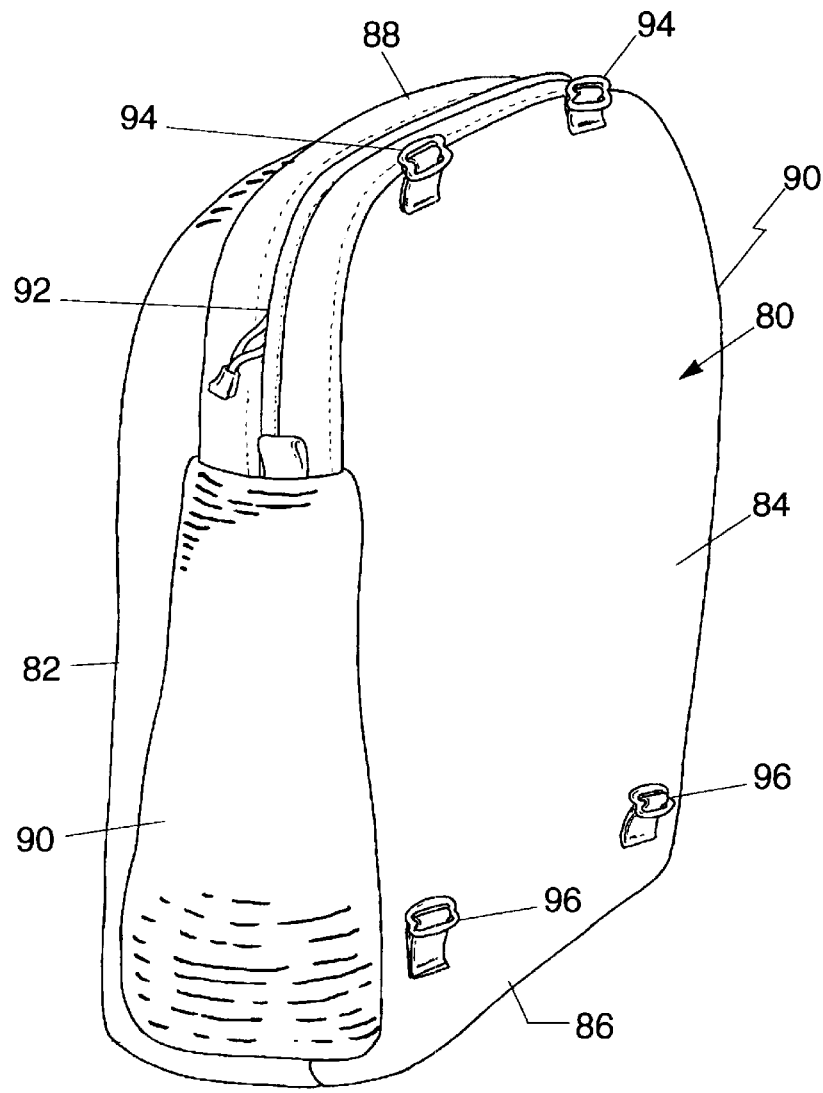
FIG. 3a is a perspective view of a day bag component for use with the harness of FIG. 1.
Figure 3B:
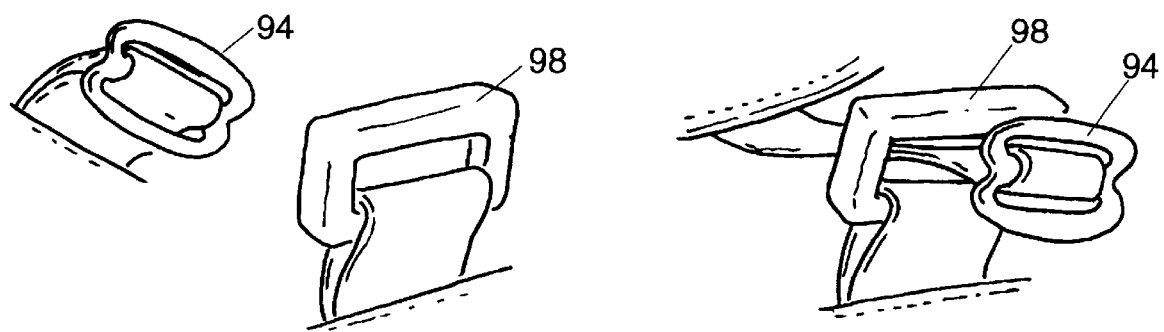
FIG. 3b is a series of figures showing the releasable three-bar/common loop attachment mechanism.

One component for use with the harness 40 is a large pouch 80, or day bag, as shown in FIG. 3a. The day bag is a receptacle having a front wall 82, a rear wall 84, a bottom wall 86, a top wall and opposing sidewalls 90. A zipper 92 extending between the sidewalls 90 and over the top wall 88 allows access to the storage cavity formed therein. The day bag 80 has two spaced fasteners 94 at the top of the rear wall 84, and two spaced fasteners 96 at the bottom of the rear wall 84. The fasteners 94, 96 are preferably fixed three-bar sliders attached at their middle bar to a length of webbing, as shown in FIG. 3b. The top fasteners 94 attach to the common loops 98 on the rear end of the padded section 60 of the shoulder straps 44, and the bottom fasteners 96 attach to the common loops 100 affixed to the waist belt. As shown in FIG. 3b, the fixed three-bar sliders fit lengthwise through the loops, but are then incapable of being retracted through the loops unless properly oriented. This attachment structure can be used for many releasable attachment needs, and is referred to hereinafter as the three-bar/common loop attachment structure.

The day bag 80 described herein is one modular component that is able to be easily attached to and disconnected from the harness system 40 as desired by the user. When attached, and the harness 40 is worn by a user, the day bag 80 rests on the user's back and is supported by the shoulder straps 44 of the harness. Other types of carrying bags or other accessories can also be attached in this way to the harness 40.

Figure 4A:
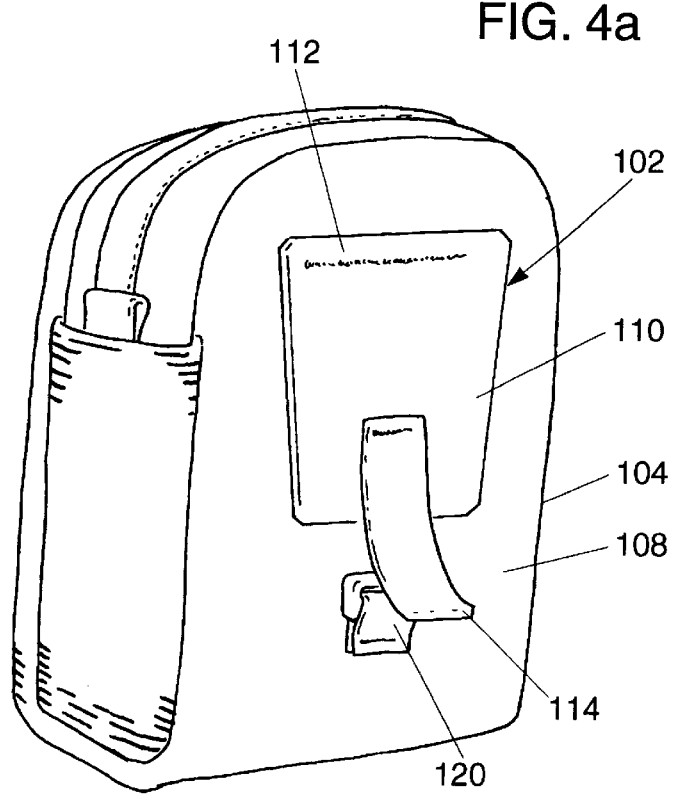
FIG. 4a is a rear perspective view of a pouch component including the spatula system for use with the harness of FIG. 1.
Figure 4B:
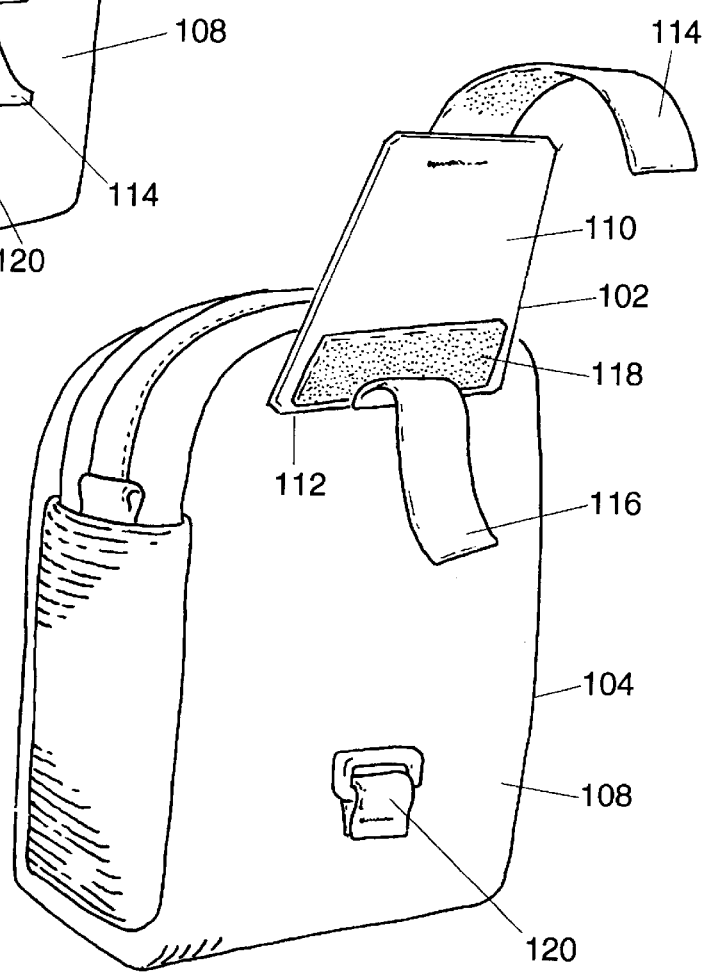
FIG. 4b is a rear perspective view of the pouch component of FIG. 4a, showing details of the spatula system.
Figure 5A:
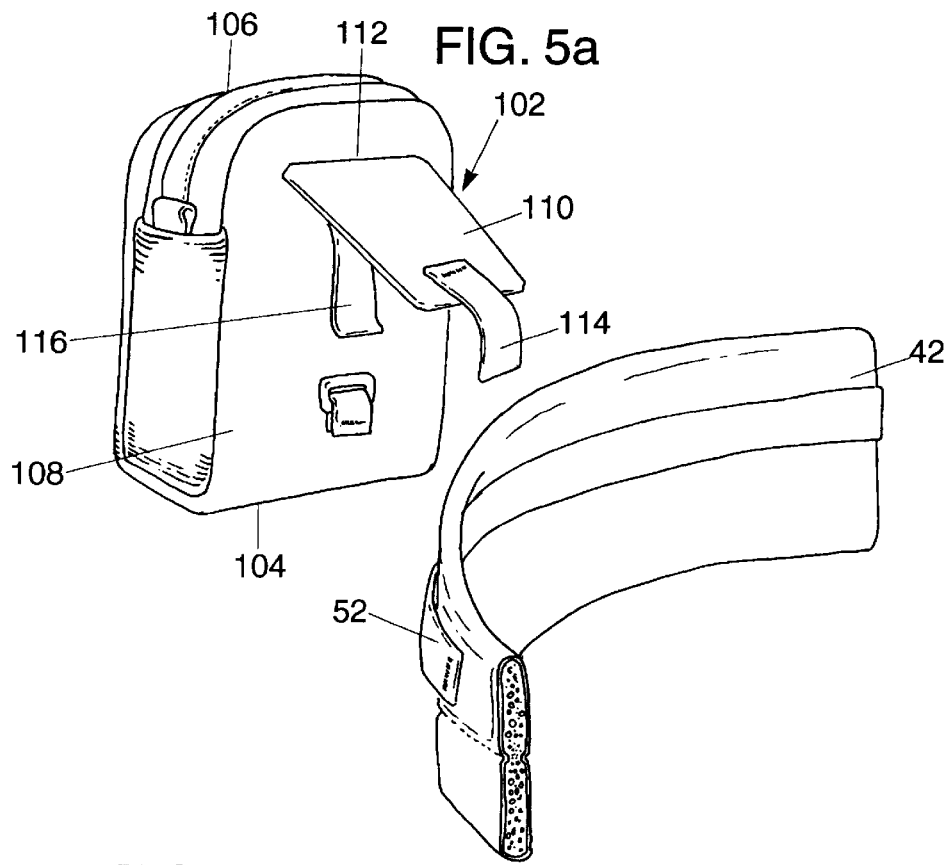
FIGS. 5a and b are rear perspective views of the attachment of the pouch component of FIG. 4a to the waist belt of the harness using the spatula system.
Figure 5B:
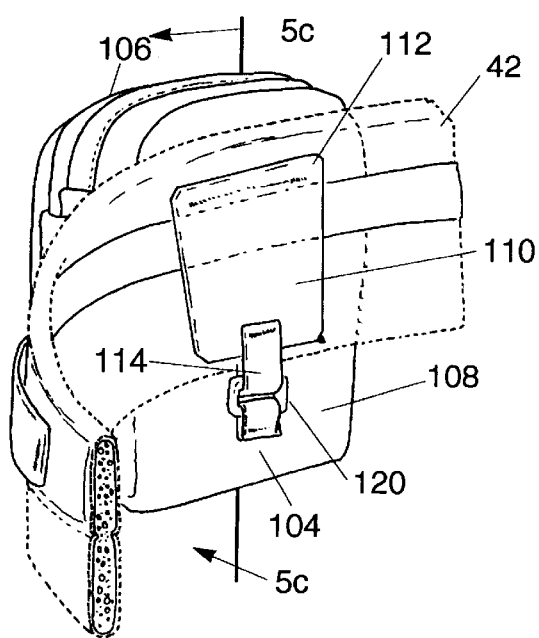
FIG. 5c is a section taken along the line 5c—5c of FIG. 5b.
Figure 5C:
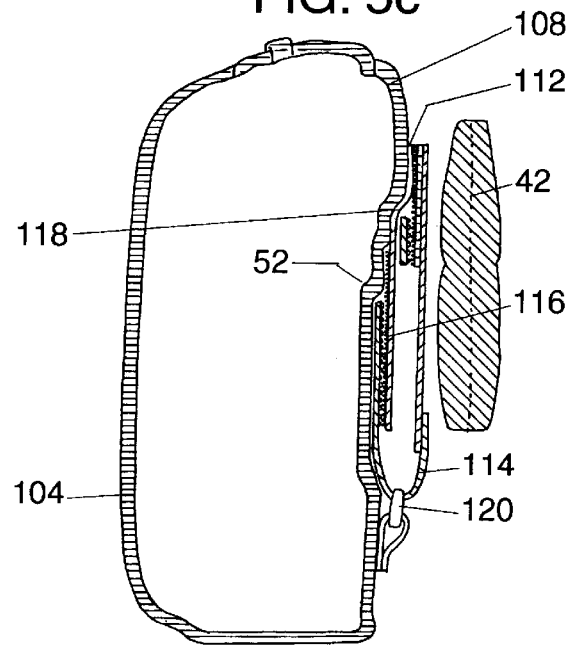
Figure 6A:
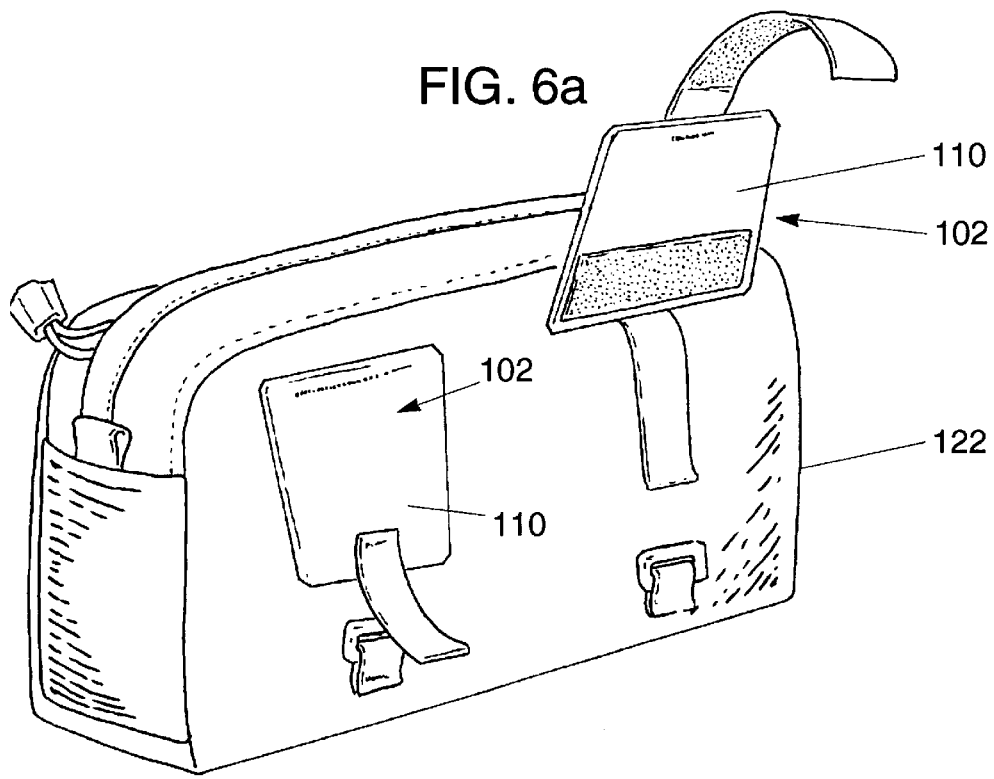
FIGS. 6a and b are rear perspective views of a larger pouch component using two spatula systems for attachment to the waist belt of the harness.
Figure 6B:
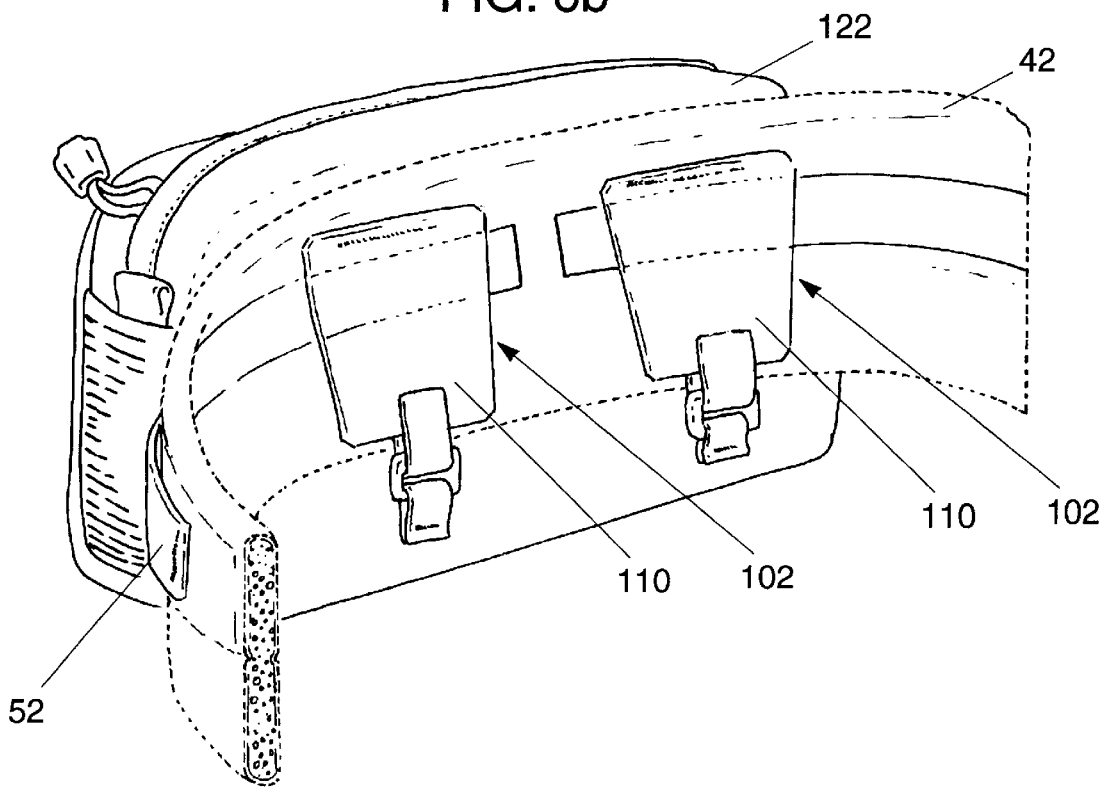

The spatula attachment system 102 for securing articles to the mounting tracks 52 on the waist belt 42 is described with respect to FIGS. 4a, 4b, 5a, 5b and 5c. A pouch 104 incorporating the spatula mounting system 102 is shown in FIG. 4a. The pouch 104 has outer walls defining an interior cargo space, and a zipper 106 opening on its top surface to allow closeable access to the cargo space. It is anticipated that the pouch 104 could have any useable shape and size as desired by the user for the intended purpose. The spatula system 102 is attached to the rear wall 108 of the pouch 104, and includes a relatively thin and rigid spatula 110 attached along a seam 112 (such as by sewing) at its upper end to the rear wall adjacent the upper end of the pouch 104. The spatula 110 lays against the rear wall 108 and can pivot about its attachment to the rear wall (see FIG. 4b). The spatula 110 can have a square, rectangular, or sloping profile as desired. Generally, the spatula 110 should be relatively wide side-to-side to support as much of the cargo carrier as possible, and relatively thin front-to-back to insert easily into the waist belt 42, as noted below. Two laterally spaced spatulas can be used on one cargo carrier if the cargo carrier is relatively long in the dimension supported by the waist belt, as shown in FIG. 6a and 6b.

A first securing strap 114 is fixed to the lower end of the outer side of the spatula, and a second securing strap 116 is affixed to the top end of the inner side of the spatula 110. A Velcro® fastener portion 118 (opposite to that attached to the inside of the mounting track) is affixed to the top end of the inner side of the spatula 110 also, and extends across substantially the entire width of the spatula. A common loop fastener 120 is attached to the bottom of the rear wall of the pouch.

The spatula system 102 allows the attachment of the pouch 104 to the waist belt 42 in a convenient, well-supported and secure manner. As shown in FIGS. 5a, 5b, and 5c, the spatula 110 is inserted between the mounting track 52 and the waist belt 42 such that the mounting track 52 engages the attachment seam 112 between the top of the spatula 110 and the pouch 104. The Velcro® portion 58 affixed to the inside face of the mounting track 52 engages the opposite Velcro® portion 118 attached to the inside face of the spatula 110 to help secure the spatula 110 in place on the mounting track. The spatula 110 will thus not likely move along the length mounting track 52, even during vigorous activity. In addition, to provide additional stability and security, the first securing strap 114 extends through the common loop 120 and back up between the spatula 110 and the pouch 104 to engage the second securing loop 116 to form an interlocked Velcro® connection. This helps insure, along with the engagement of the spatula 110 and the mounting track 52, that the spatula 110 does not accidentally disconnect from the mounting track 52. See FIGS. 5b and 5c. It is contemplated that engagement by the spatula 110 alone with the mounting track 52 is sufficient to support and securely attach a cargo carrier 104 to the waist belt 42. The additional position stabilizing structure provides enhanced benefits, but are not required to be used. The position of the mounting track 52 on the top half 56 of the belt 42 allows the bottom of the spatula 110 to rest on the waist belt 42 to further stabilize the position of the pouch 104 on the waist belt 42.

The spatula mounting system 102 allows the user to conveniently and securely mount the desired type of cargo carrier to the waist belt 42 at the desired location. The spatula system 102 spreads the load of the cargo carrier along the length of the spatula 110 (such as along the length of the seam attaching the spatula to the cargo carrier) to provide better load distribution and load stability. The cargo carrier is thus easily removed or its position adjusted by the user. The spatula 110 can be used to attach a variety of components to the waist belt.

As noted above, where a cargo carrier 122 is relatively long in the dimension to be supported by the mounting track 52, more than one spatula 110 may be used to sufficiently support and securely attach the cargo carrier 114 to the mounting track 52. An elongated cargo carrier 122 is shown in FIGS. 6a and 6b which requires the use of two laterally spaced spatulas 110, each having the same structure as described above with respect to FIGS. 5a, 5b and 5c. The elongated cargo carrier 122 is adequately secured to and supported on the mounting track 52 by the two spatula systems.

Figure 7C:
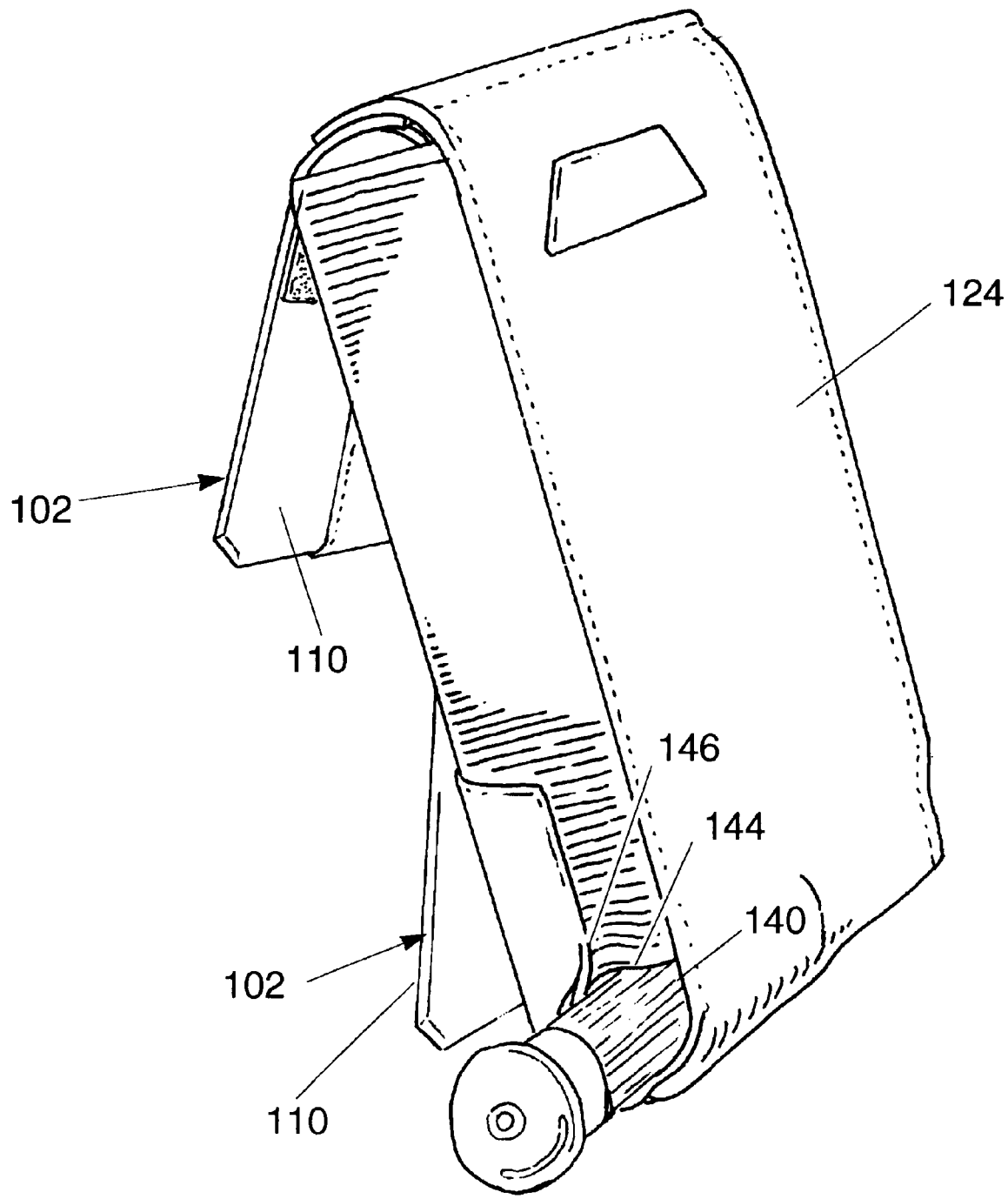
FIG. 7c is a front perspective view of the shell carrier pouch of FIG. 7a, with a shell ejecting from an aperture.

FIGS. 7a, 7b and 7c show the application of the spatula mounting system 102 on a cargo carrier 124 having an elongated dimension orthogonal to the length of the mounting track 52. The shotgun shell dispenser has two vertically spaced spatula systems 102 attached to its rear face. If the dispenser is to be carried on the waist belt 42, only one of the spatula systems would be used to attach to the mounting track 52. Where the shell dispenser 124 is required to be supported securely along its length, such as when it is worn on a vest in a police or military operation, both of the two vertically spaced spatula systems 102 can be employed. This requires that the support structure, such as the vest, have two vertically spaced mounting tracks 52 for the two vertically spaced spatula systems to be affixed to, as described above.

The shell dispenser 124 of the present invention is unique in its storage and mode of dispensing shells. The dispenser 124 has an elongated, vertically oriented, rectangular body defining an interior cavity. The dispenser 124 has a front wall 126, a rear wall 128, two opposing sidewalls 130, a bottom wall 132, and a pair of overlapping flaps 134, 136 forming the top wall. The dispenser 124 is dimensioned to have a side-to-side width sufficient to hold a shot gun shell lengthwise, a front-to-back depth sufficient to hold a shotgun shell widthwise, and a top-to-bottom length to hold a plurality of shotgun shells stacked side-by-side on one another. The two overlapping flaps 134, 136 of the top wall secure to one another, such as by a Velcro® fastener, to allow access to the interior cavity. A dispensing port 138 is formed at the lower end of one of the sidewalls 130. The dispensing port 138 defines an aperture having four sides 140, 142, 144, 146, three of which are made of the material of the dispenser, and are relatively fixed in length. The fourth side 146 is made of a resilient material that can change dimension and return to its original dimension, such as elastic. The dispensing port 138 is smaller than the outer dimension of the shotgun shell.

The shells are positioned in the dispenser 124 such that the primer end is adjacent the side having the dispensing port 138. As seen in FIG. 7a, the end of the bottom most shell is substantially covered only around its perimeter by three of the four sides 140, 142, 146, of the dispensing port 138, one of which is the resilient wall 146. To dispense a shell, the user grasps the opposite end of the bottom-most shell through the front 126 and rear dispenser walls 128 and pinches the walls to push the shell towards the dispensing port 138. As the primer end of the shell is pushed through the dispensing port, the resilient wall 146 stretches to allow the shell to exit the port, as shown in FIG. 7c. The user then grasps the shell and pulls it the rest of the way out of the dispensing port 138. The resilient wall 146 then returns to its normal position, such as in FIGS. 7a or 7b. The rest of the shells in the dispenser 124 shift downwardly to set up the next shell adjacent to the dispensing port 138. Unless the shell is forced through the dispenser port 138 to deform the resilient wall 146, the resilient wall is sufficiently sturdy to keep the shells from exiting the dispenser port 138. The shell dispenser 124 is designed to hold a plurality of shells, for instance 12.

Figure 8A:
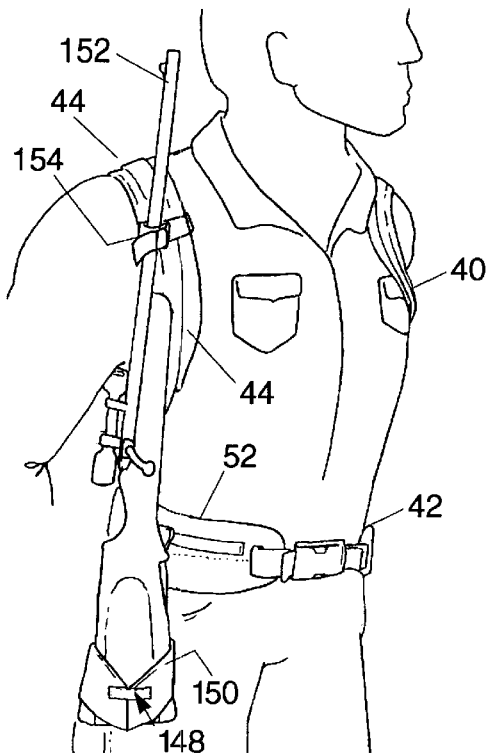
FIG. 8a, b, c and d show the long gun support system, including the buttstock cradle and the barrel fastener, used with the harness of the present invention.
Figure 8B:
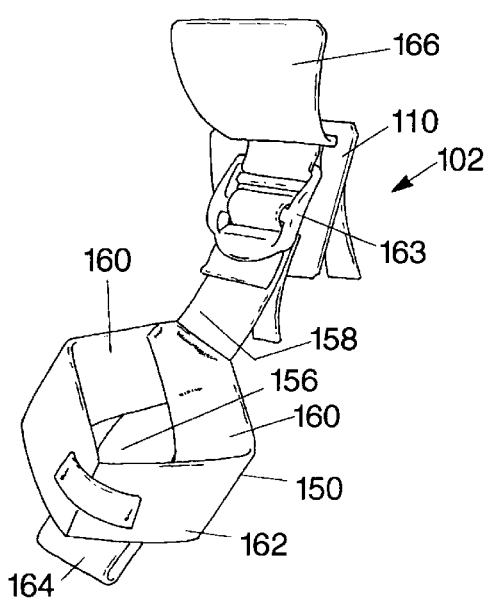
Figure 8C:
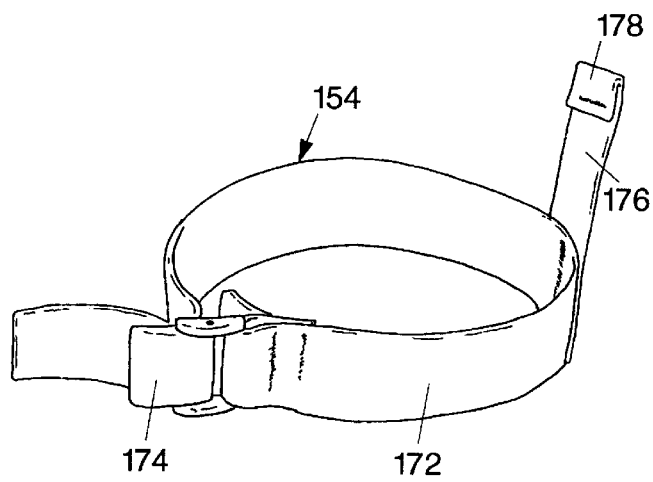
Figure 8D:
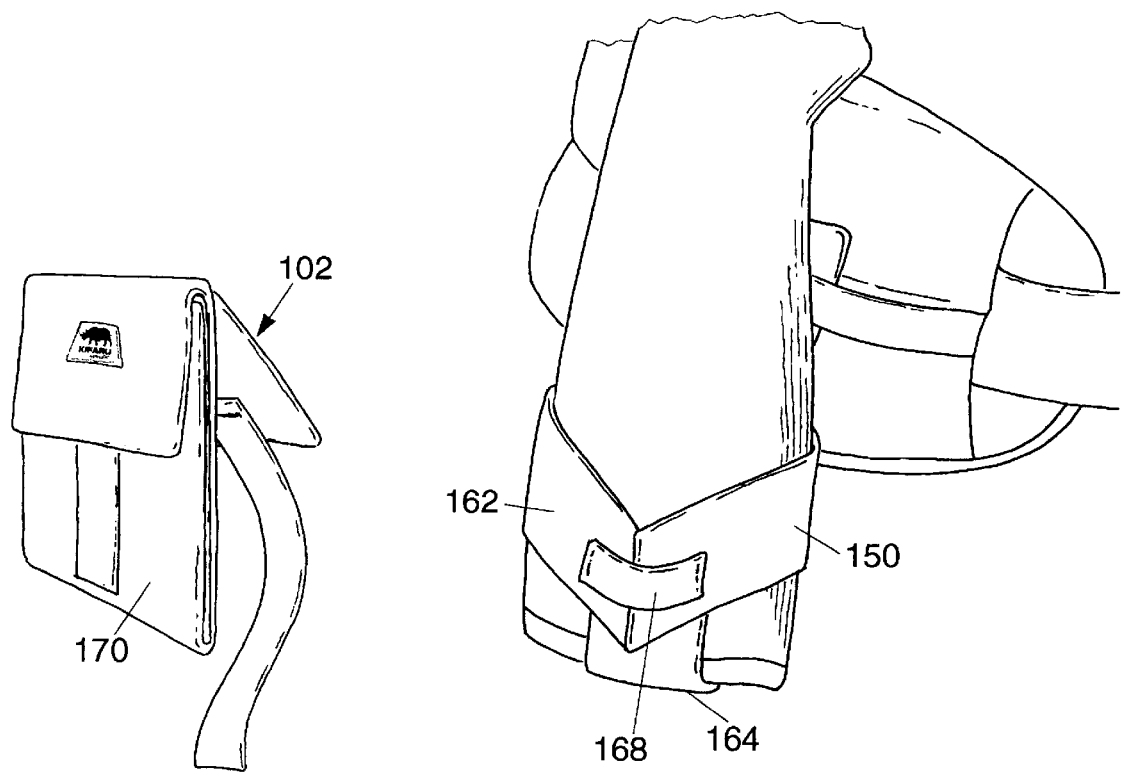

FIGS. 8a, 8b, 8c, 8d, and 9 show another component, a long-gun support system 148, which utilizes a cradle 150 attached to the spatula system 102 to support the long gun 152 from the waist belt 42, and a barrel fastener 154 to releasably attach the barrel to the shoulder strap 44. The cradle 150 is made of nylon webbing which forms a receptacle 156 and holds the buttstock of the long gun 152 (such as a rifle or shot gun). As best shown in FIG. 8b, the cradle receptacle includes a support member 158 attached to the spatula system 102, the support member 158 forming the backbone of the cradle 150. Two opposing side members 160 extend outwardly and downwardly from the support member 158. The two opposing side members 160 curve forwardly and attach together in front of and spaced away from the support member 158 forming a loop 162. The opposing side members 160 attach together at a point below where they attach to the support member 158. This allows for easier removal of the buttstock from the cradle 150. The support member 158 forms the bottom 164 of the cradle by extending downwardly and then curving upwardly to meet and attach to the ends of the side members 160. The cradle 150 holds the generally wedge-shaped buttstock of the firearm securely. A buttstock can be removed from the cradle 150 by being moved upwardly. It is very difficult to remove the buttstock from the cradle 150 in any other direction. Since the cradle 150 is preferably made of webbing or other such material, it conforms to different sizes and shapes of buttstocks.

Figure 9:
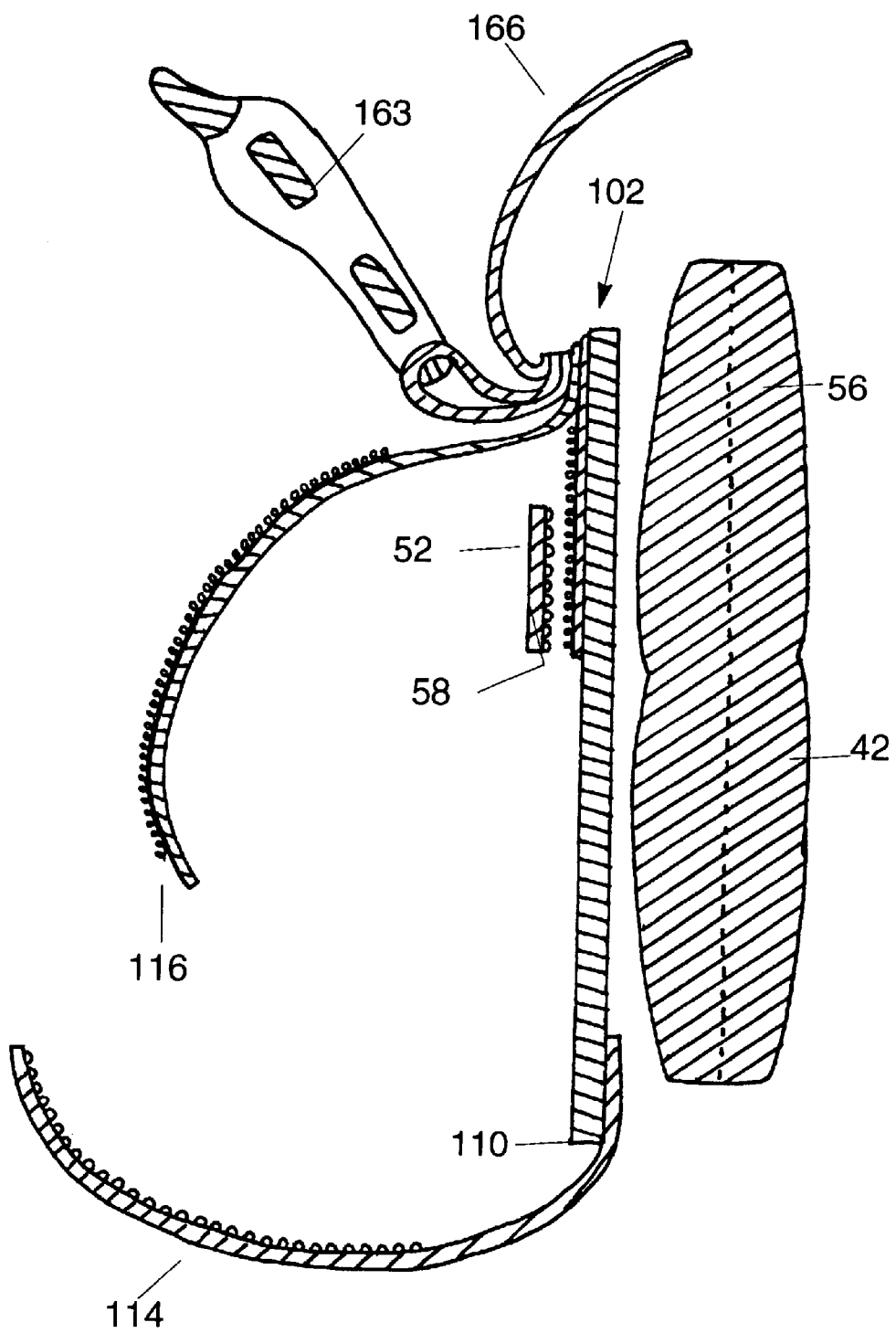
FIG. 9 is a representative section view of the spatula system used with the buttstock cradle.

The support member 158 of the cradle is attached to the spatula system 102 as shown in FIGS. 8b and 9. For use with the cradle 150, the spatula system 102 includes a ladder lock 163 attached to the top of the spatula 110. The support member 158 of the cradle 150 adjustably engages the ladder lock 163 so as to hang from the ladder lock, and thus from the spatula 110. The first 114 and second 116 security straps are attached on the spatula 110 as described above, as is the Velcro® portion. A protective flap 166 is attached to the spatula 110 to hang over the ladder lock 163 to protect the buttstock from being scratched by the ladder lock 163.

In attaching the cradle 150 to the waist belt 42 of the harness 40, as shown in FIG. 9, the spatula 110 is inserted between the mounting track 52 and the waist belt 42, as described above with the spatula system 102, and the first 114 and second 116 security straps are fastened together. In use with the gun cradle 150, the first 114 and second 116 security straps do not attach through a loop on the cradle 150 as the earlier security straps attach through a common loop on the pouch. Nonetheless, the security straps 114, 116 securely fix the spatula 150 to the waist belt 42. The buttstock is then placed in the cradle 150, preferably with the trigger facing forwardly (to the right in FIG. 8a). The weight of the long gun 152 is thus suspended from the waist belt 42, and thus the user's waist and hips, by the spatula system 102. The lateral position of the cradle 150 is secure when on the mounting track 52. The cradle 150 can be positioned anywhere along the mounting track 52 to adjust for waist size. The cradle 150 can be moved upwardly or downwardly with respect to the waist belt 42 by extending or retracting the support member 158 in the ladder lock 163 on the spatula system 102. This helps adjust the position of the cradle 150 according to the length of the long gun 152. An additional mounting track 168 can be positioned on the front of the cradle 150 to support another cargo carrier 170 (such as a cartridge case) using the spatula system 102.

In addition to the cradle 150, the long gun support system 148 includes a barrel fastener 154 to releasably attach the barrel to the shoulder strap 44 while the buttstock is in the cradle. See FIG. 8c. The barrel fastener 154 includes an elongated flexible main member 172 with opposing ends. A quick-release cam lock buckle fastener 174 is fixed to one end of the main member 172, and the other end of the main member is free. A suitable cam lock buckle fastener 174 is the Fix Lock® 825 by Illinois Toolworks, Inc. of Chicago, Ill. The free end of the main member 172 can be releasably secured in the quick-release cam lock fastener 174, and is also adjustable in length to surround differently sized barrels. The barrel fastener 154 is released by simply grasping the free end of the main member 172 and pulling to release the quick-release fastener 174. The barrel of the firearm 152 is then disconnected from the shoulder strap 44 and can be grasped by the same or different hand.

The barrel fastener 154 is attached to the shoulder strap 44 by a tail 176 member. The tail 176 is affixed to and extends upwardly from the main member 172 of the barrel fastener 154. The top end of the tail 176 has a folded over portion 178 which is sewn to itself, forming a seam. The barrel fastener 154 is positioned on the shoulder strap 44 of the harness 40 by inserting the tail 176 into the three-bar slider 78 positioned on the mounting track 76 attached to the shoulder strap 44 (See FIG. 2.) The folded over top portion 178 of the tail acts as a mechanical jam member in the three-bar slider 78 and thus resists the removal of the tail 176 therefrom. Relatively less up/down force is applied to the three-bar slider 78 by the barrel fastener 154 because most forces are laterally directed, and as such the three-bar slider 78 is not likely to move appreciably up and down the mounting track 76 when the barrel fastener 154 is in use.

In using the long gun support system 148, the cradle 150 is attached to the spatula 110, and the spatula is attached to the mounting track 52 on the waist belt 34, as described above. Preferably, the spatula 110 is applied adjacent to or just in front of the hip of the user. The barrel fastener 154 is attached to the shoulder strap 44 on the same side of the harness 40 as the cradle 150. The cradle 150 can be vertically adjusted to accommodate the length of the long gun. The buttstock is inserted into the cradle 150 with the trigger facing forward. The barrel of the gun is releasably secured to the shoulder strap 44 by the barrel fastener 154. In this manner, the long gun is supported from the waist belt 42 of the harness 40, and held closely along the user's body by the barrel fastener 154. This allows the user to keep both hands free for climbing, working or any other purpose. The long gun support system 148 also allows the firearm to remain handy even when using a load supporting system having a shoulder strap 44 like the harness 40. The optical sighting device on the firearm, if any, is positioned under the user's arm in a relatively protected location. The long gun support system allows a user to carry support gear in the day bag on the harness (with shoulder straps) while at the same time carrying a long gun. The system allows all this in a manner that is comfortable, protects the long gun, and keeps the long gun ready for immediate use. The long gun is thus carried more securely, safely and in a more accessible location.

The long gun support system also allows the firearm to be quickly removed from the support system and shouldered. The user simply releases the quick-release fastener 174 (left hand per FIG. 8a), and grasps the buttstock with one hand (right hand per FIG. 8a) and then the barrel with the other (left hand per FIG. 8a). The user lifts the rifle slightly upwardly to remove the buttstock from the cradle 150, and then shoulder's the firearm. There are different manners by which the firearm can be released from the support system, but each requires the release of the barrel fastener 154 and slightly lifting the firearm to remove it from the cradle 150.

Figure 10A:
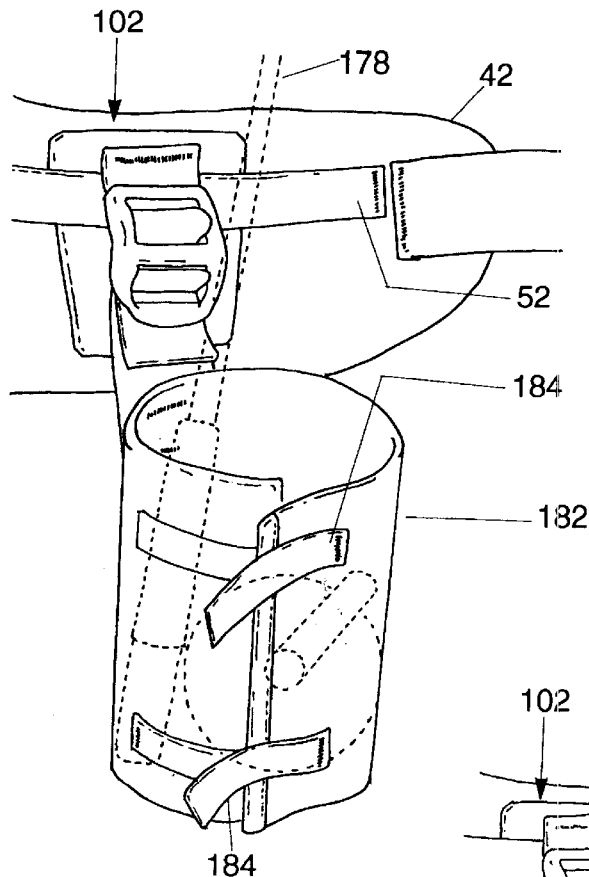
FIG. 10a is a front perspective view of a fly rod holder attached to a waist belt using a spatula system.
Figure 10B:
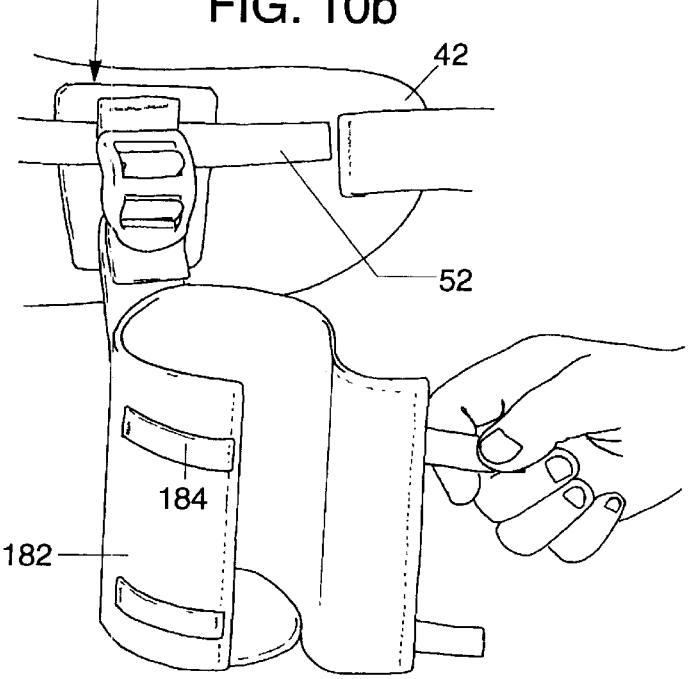
FIG. 10b is a front perspective view of the fly rod holder being adjusted for size.
Figure 11A:
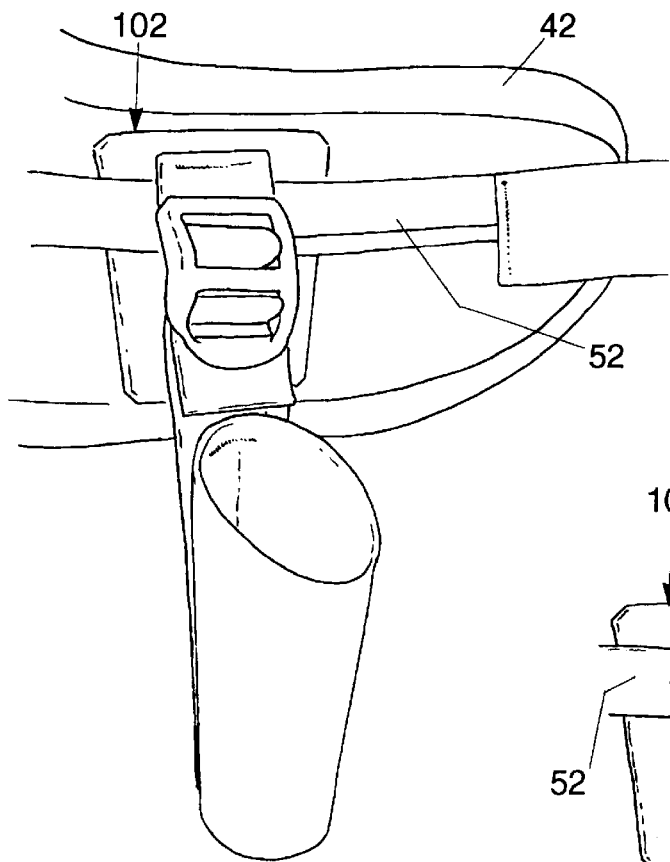
FIG. 11a is a front perspective view of the spinning rod holder having a spatula system.
Figure 11B:
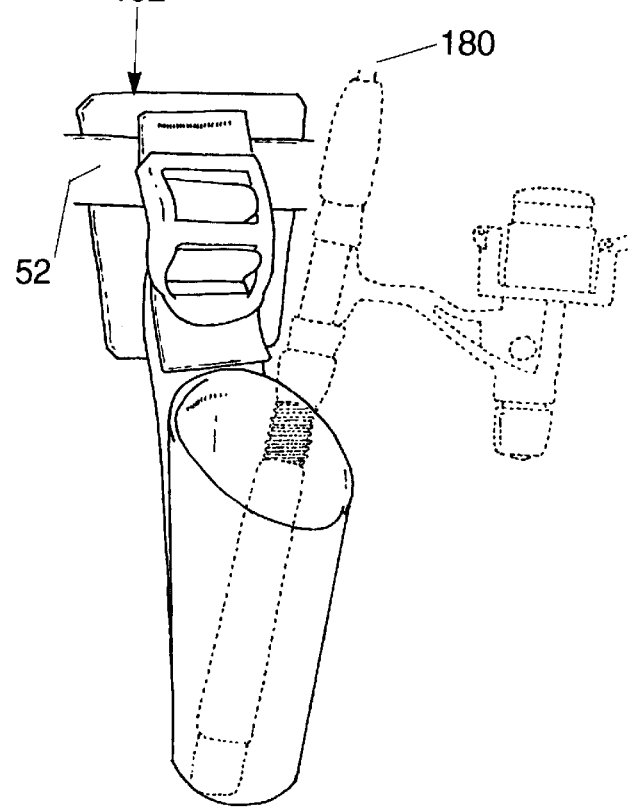
FIG. 11b is the spinning rod holder of FIG. 11a showing a spinning rod in dash.
Figure 12A:
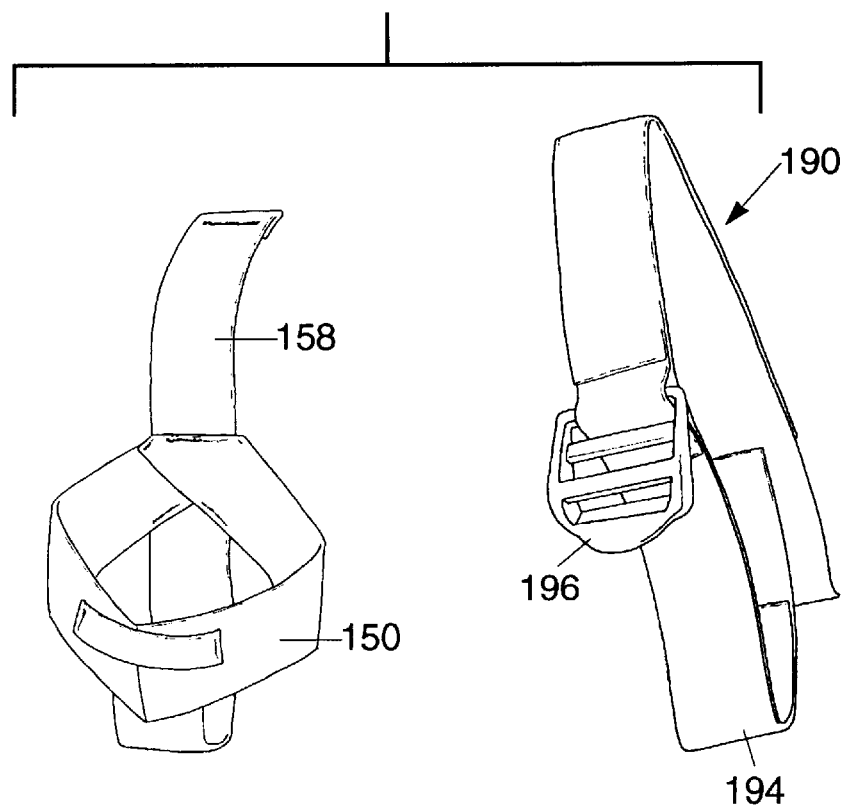
FIG. 12a is an exploded view of an alternative embodiment of the buttstock cradle.
Figure 12B:
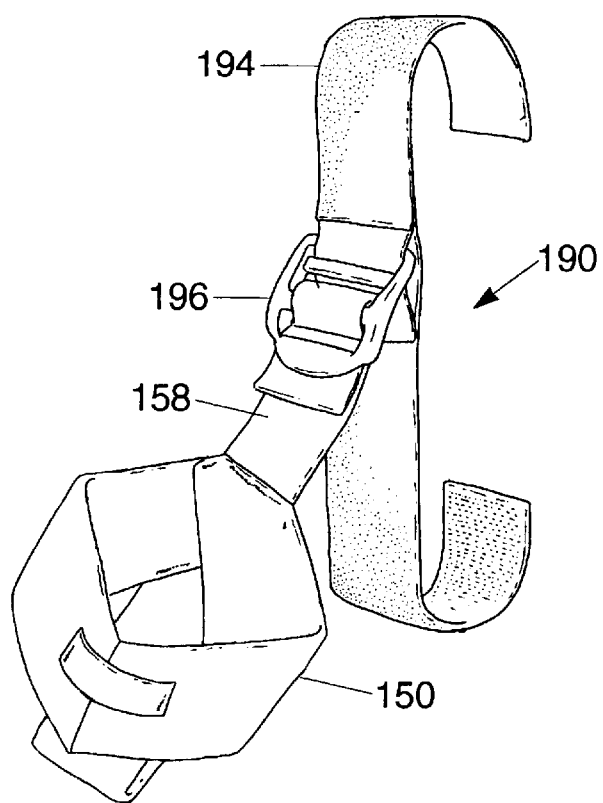
FIG. 12b shows the portions of the alternative embodiment of the buttstock cradle assembled together.
Figure 12C:
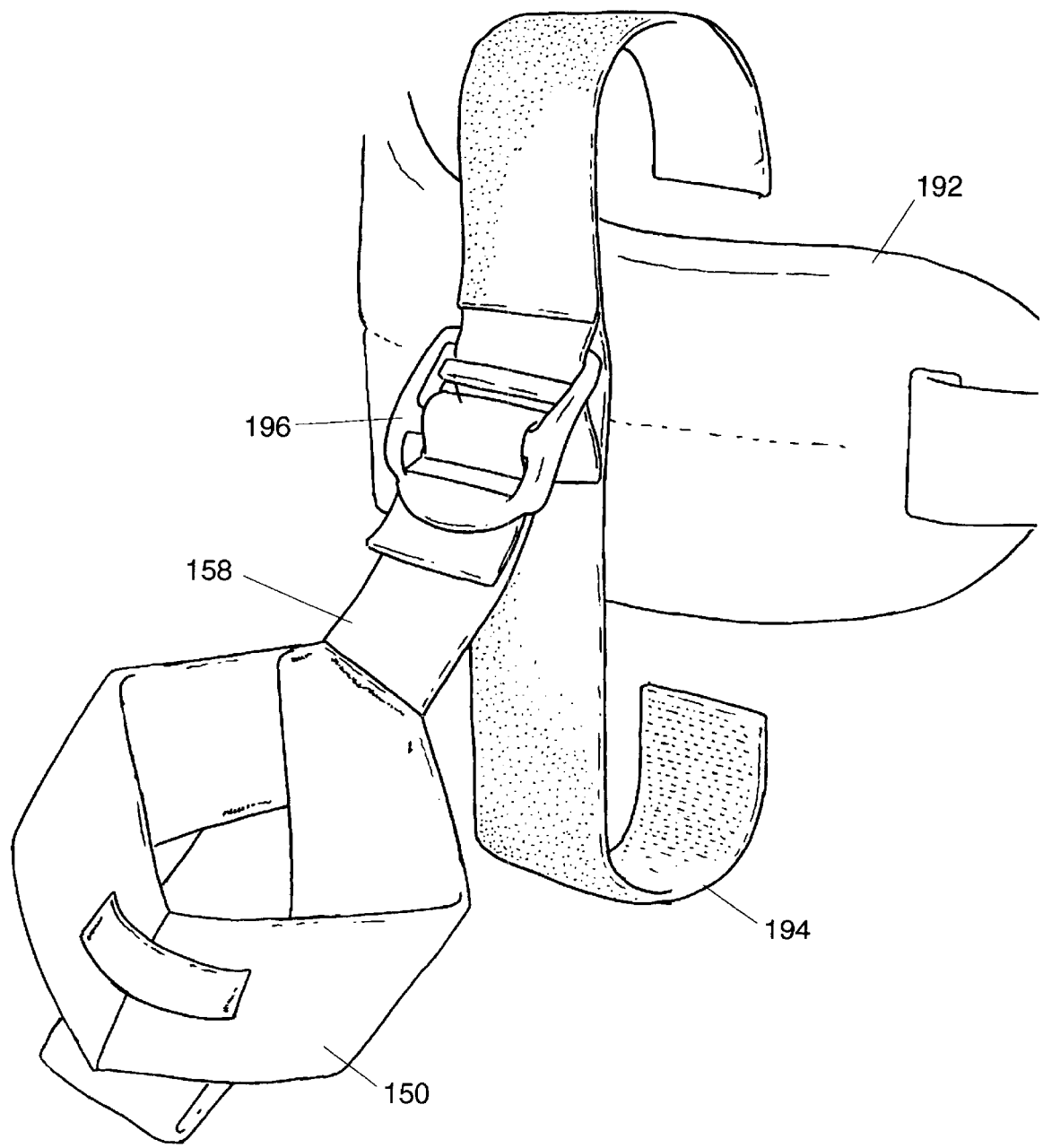
FIG. 12c shows the attachment of the alternative embodiment of the buttstock cradle to a generic waist belt of a load bearing system.
Figure 13A:
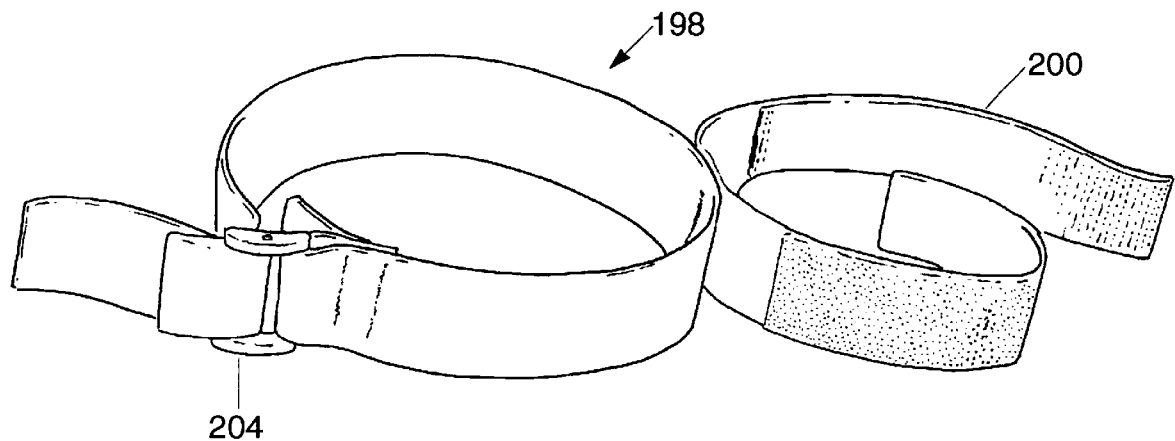
FIG. 13a shows an alternative embodiment of the barrel fastener for use on a generic shoulder strap.
Figure 13B:
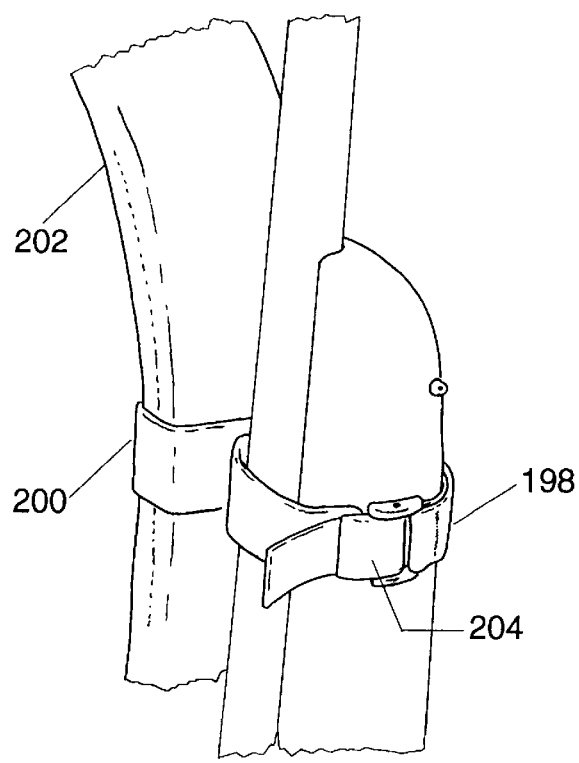
FIG. 13b shows the alternative embodiment of the barrel fastener holding a barrel.

Other long items that are often carried while hunting, hiking or backpacking can be carried with a similar support structure. FIGS. 10a, 10b and 11a, and 11b show structures used for carrying fly rods 178 (FIGS. 10a and 10b) and spinning rods 180 (FIG. 11b). As shown in FIGS. 10a and 10b, a fly rod 178 is supported from a spatula system 102. The only difference between the fly rod 178 system and the long gun support system 148 is that the cradle is replaced by a padded, cylindrical receptacle 182 having adjustable cylindrical sidewalls, an open top and a base. The end of the fly rod, including the reel, is inserted into the receptacle 182. The receptacle is sized, using releasable fasteners 184, such as Velcro®, to overlap more or less of the receptacle wall to create the right size (FIG. 10b). The end of the rod and reel 178 are securely held in place in the receptacle 182. The top end of the rod is held in place by the barrel fastener 154 as described above with respect to the gun barrel. In this manner the fly rod 178 and reel are securely supported on the waist belt 42 of the harness, and secured along the body of the user by attaching to the shoulder strap 44, which gives the user the same advantages as denoted previously. The rod 178 is released from the fly rod support system in the identical manner as noted for the long gun.

A support system for a spinning rod 180 is shown in FIGS. 11 and 11b. In this case, the cradle 150 of the long gun support system 148 is replaced by a cylindrical spin rod receptacle 186 having an open top, a cylindrical sidewall and a base. The end of the spin rod 180 is inserted into the spin rod receptacle 186, with the reel extending outwardly from the pole above the receptacle 186. Preferably, the receptacle 186 is frustoconical in shape to guide or even wedge the end of the spin rod 180 therein for a secure fit. The top end of the spinning rod is held in place by the barrel fastener 154 as described above. In this manner the spinning rod 180 is securely supported on the waist belt 42 of the harness 40, and secured along the body of the user by attaching to the shoulder strap 44, which gives the user the same advantages as denoted previously. The rod is released from the spin rod support system in the identical manner as noted for the long gun.

A long gun support system 148 was described above for applications on a harness having the required mounting track 52 for the spatula system 102. Another embodiment of the instant invention, as shown in FIGS. 12*a*, 12*b*, 12*c*, 13*a* and 13*b*, allows the long gun support system 190, including the gun cradle 150 and the barrel fastener 154, to be used on backpacks and load bearing systems not including the mounting tracks 52. The gun cradle 150 in FIGS. 12*a*, *b* and *c* is identical to that described earlier. Instead of using a spatula system, however, the gun cradle 150 is supported from the padded waist belt 192 of a generic backpack by a universal attachment strap 194 having a ladder lock 196 affixed thereto for securing the support member 158 of the cradle 150 (as discussed above), as shown in FIG. 12*b*. The universal attachment strap 194 is a flexible elongated nylon webbing with Velcro® fastener attached to one side, and the opposite Velcro® fastener attached to the opposite side. The strap could be Velcro® alone. The attachment strap 194 is wrapped around the waist belt 192 at the desired location (such as adjacent the user's hip), and the strap 194 fastened thereto by the Velcro®, see FIG. 12*c*. The attachment strap 194 is attached tightly enough to minimize any lateral, vertical or rotational movement of the attachment strap 194 along the waist belt 192. The length of the attachment strap 194 is relatively longer for a padded waist belt 192, and relatively shorter for an unpadded waist belt (not shown). The cradle 150 thus functions identically to that described above utilizing the spatula system.

The barrel fastener 198 is substantially similar to that described above, except that instead of a tail extending from the main member, a Velcro® attachment loop 200 extends therefrom to secure around a generic shoulder strap 202 that does not have the three-bar slider or the mounting track. See FIG. 13*a*. The attachment loop 200 fastens around the shoulder strap 202 at the desired location. Since little vertical load is placed on the barrel fastener 198, the attachment loop 200 does not slide appreciably up or down the shoulder strap 202. The quick-release fastener 204 is again used to releasably secure the gun barrel as described above. The operation to remove the firearm from the embodiment of the long gun support system is identical to that described above. Using this embodiment of the long gun support system in conjunction with any type of backpack tends to stabilize and secure the long gun, especially during any type of brisk movement. The gun is in front of the shoulder, and thus there is relatively no interference with the "shoulder lift" feature found on some backpacks.

Similar universal attachment systems can be used to attach the fly rod and spinning rod support systems to a backpack or load bearing system that does not include the mounting track (and thus cannot use the spatula system), all with the same benefit as earlier described.

Figure 14A:
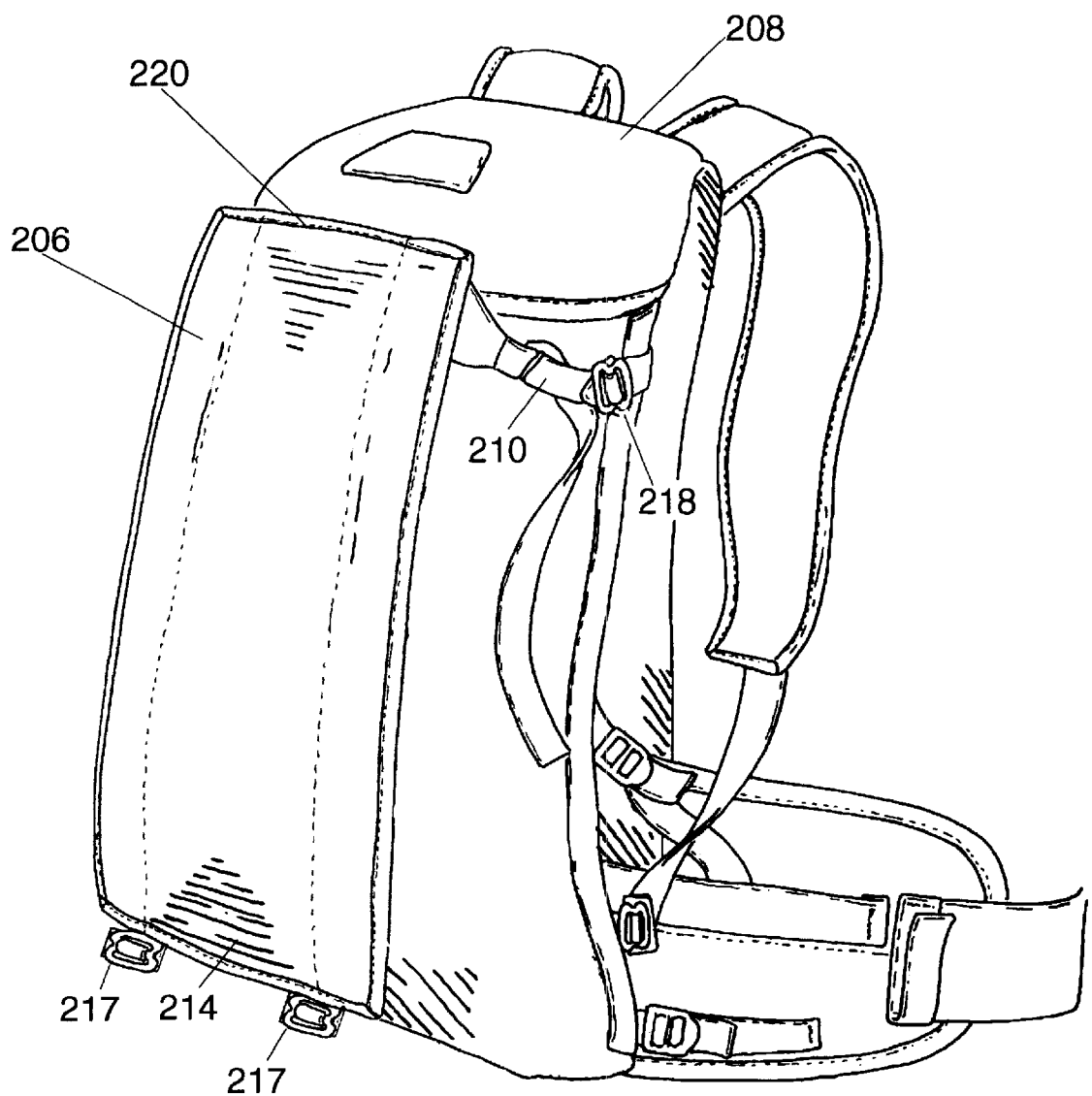
FIG. 14a shows a backpack having the panel extension of the present invention in the collapsed position.

Another feature of the instant invention includes the use of a semi-rigid multi-purpose panel 206 extension pivotally attached to the bottom of a backpack 208 and supported by tie-straps 210 from the top of the backpack. See FIGS. 14*a*, 14*b* and 14*c*. The panel extension 206 can be oriented to extend substantially orthogonally in front of the pack 208 for use as a seat. Alternatively, the panel extension 206 can be oriented to extend substantially orthogonally behind the pack 208 for use as a cargo carrier to haul out large objects, such as game. In each orientation, the panel extension 206 is supported by tie straps 210 extending to the upper sides of the backpack 208. In the travel mode, or the collapsed position, the panel extension 206 can be folded up to lie adjacent to the rear wall of the backpack 208, and secured there by shortening the tie straps 210.

In more detail, the extension 206 is a rectangularly shaped padded flat panel having aluminum stays 212 along its side edges for improved strength and stability. The bottom edge 214 of the panel is attached at least in two places along its width dimension to the bottom 216 of the backpack 208. The attachment is by a three bar slider/common loop attachment structure 217 that acts as a hinge to allow the panel to flip from extending forwardly to extending rearwardly, and to extending upwardly to lie against the backpack.

Tie straps 210 extend from the top of each side of the backpack 208 to the corresponding corner of the free end 220 (top end) of the panel. See FIGS. 14*b* and 14*c*. The upper end of the tie straps 210 can be attached to the backpack 208 at any location sufficient to provide the proper support to the panel extension 206. Preferably, the tie straps 210 are positioned high enough on the pack 208 to securely hold the panel 206 in the collapsed position, discussed below. The top end of the tie straps 210 are respectively attached to the backpack using the three-bar/common loop attachment structure 218. Preferably in this case the common loop 222 attached to the backpack is triangular in shape to more securely hold the three-bar slider. The bottom end of each tie strap is secured to the respective corner 224 of the panel 206 through a tension lock buckle 226, or any other attachment structure that allows the strap to be fixed in position, yet be adjusted when so required. The tension lock (ladder lock) buckle 226 is attached to the panel by a fabric brace 228, preferably offset from the corners. By shortening the tie straps through the tension lock buckle 226, the panel 206 can be pulled into the collapsed position to lie against the rear wall of the backpack 208. See FIG. 14*a*. By loosening the tie straps 210 in the tension lock buckle 226, the panel 206 can be positioned to extend orthogonally from the rear of the backpack 208. In this position the panel 206 acts as a freight shelf so that large objects can be supported by the panel when the backpack is being worn. The panel 206 supports the large items outside of the backpack 208 so as to not contaminate the contents of the backpack. The panel 206 could also extend at an angle downwardly or upwardly from the rear of the backpack 208 as desired by adjusting the length of the tie strap 210 in the tension lock buckle 226.

The panel can extend from the front of the backpack 208 (see FIG. 14*b*) to act as a chair. The panel 206 is either disconnected from the tie straps 210, or the tie straps are lengthened to their maximum length and the panel swung under the pack 208 to extend forwardly from the front of the backpack. The tie straps 210 connect the panel to the pack to allow a user to sit on the panel and lean back on the backpack.

In an additional embodiment, the panel extension 206 can be mounted on the support system of FIGS. 1 and 2. The tie straps are attached at their upper ends to the shoulder straps, and at the bottom ends to the top end of the panel. The bottom end of the panel is pivotably attached to the back of the waist belt in a similar manner to that described above for attaching it to the backpack.

Figure 15A:
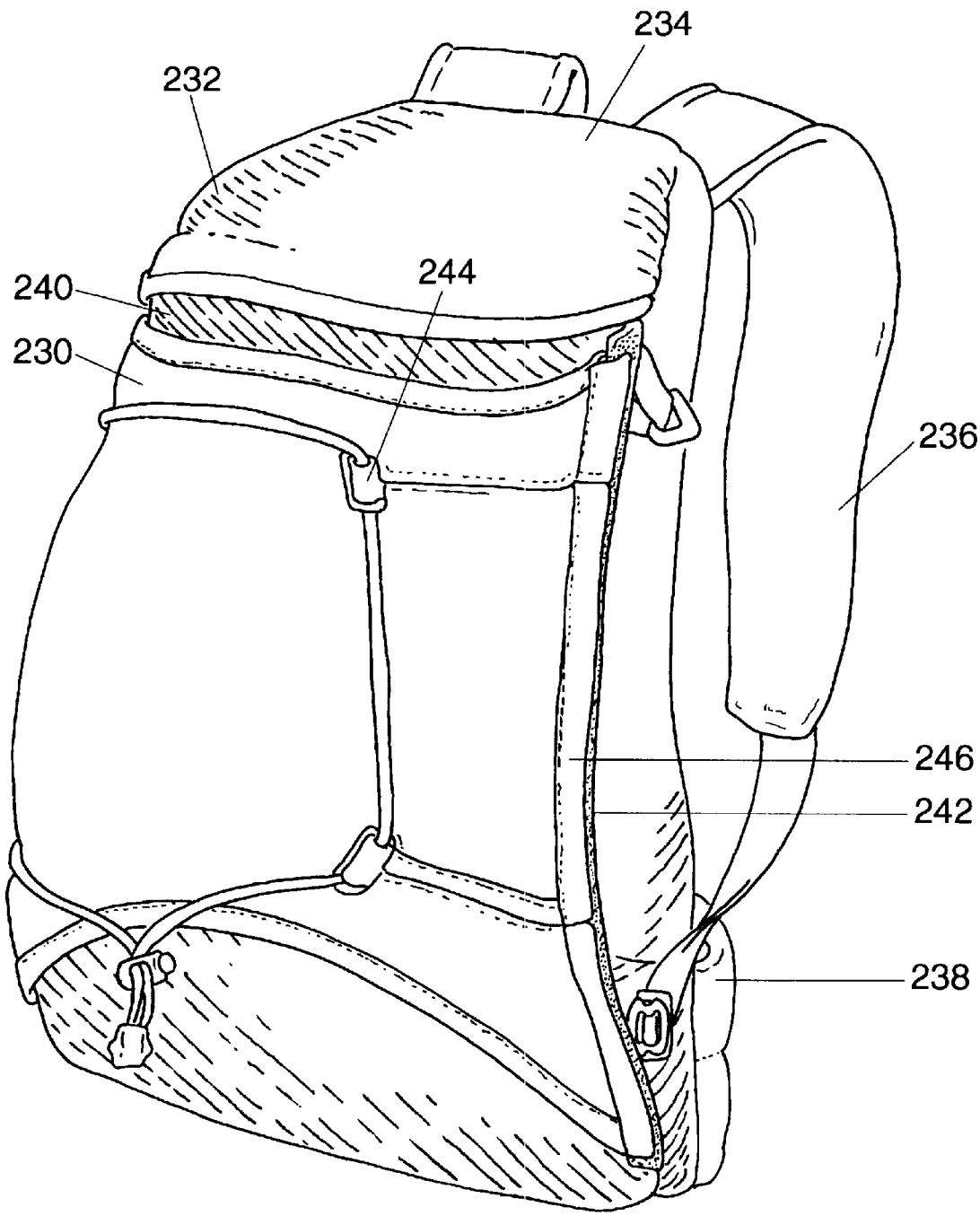
FIG. 15a shows a backpack having the fabric panel of the present invention positioned thereon.
Figure 15B:
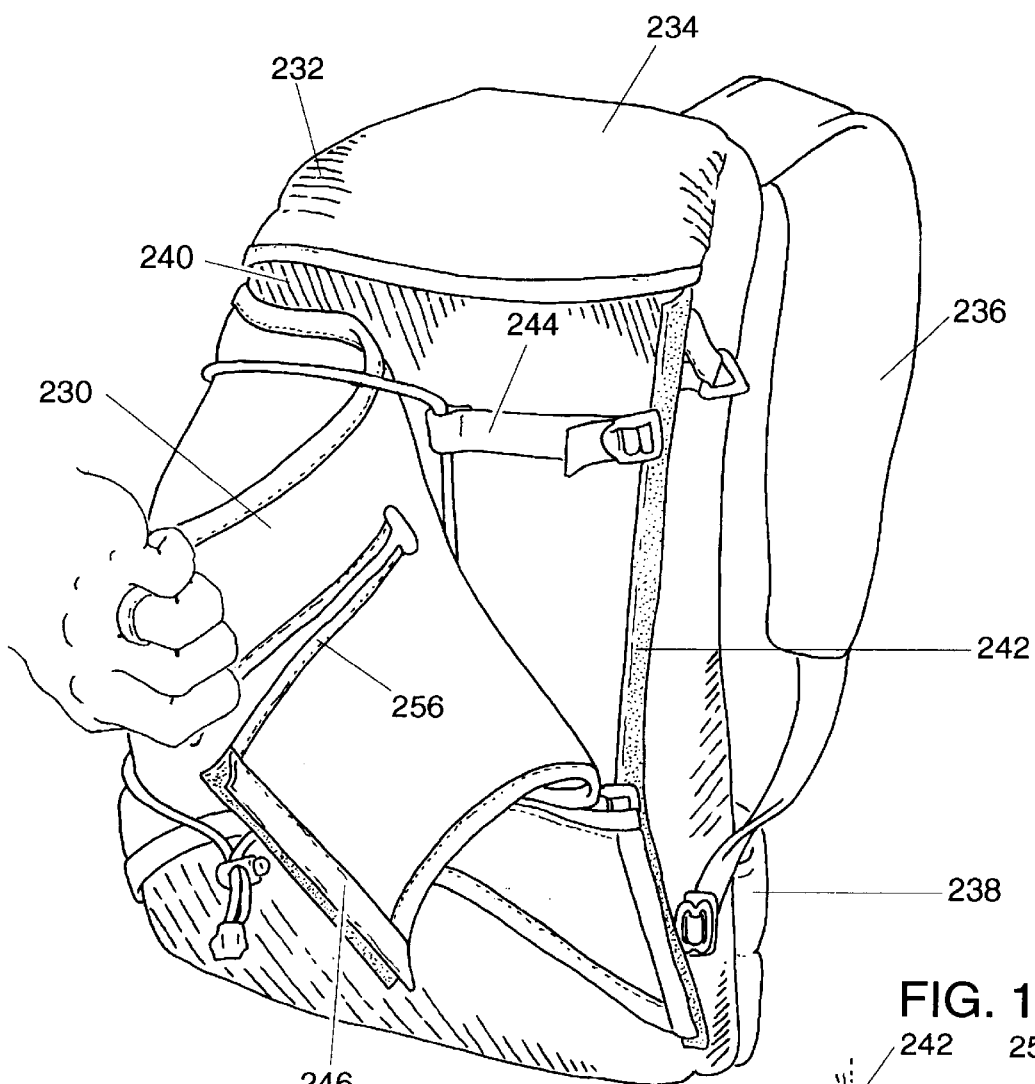
FIG. 15b shows the fabric panel being removed from the backpack.
Figure 15C:
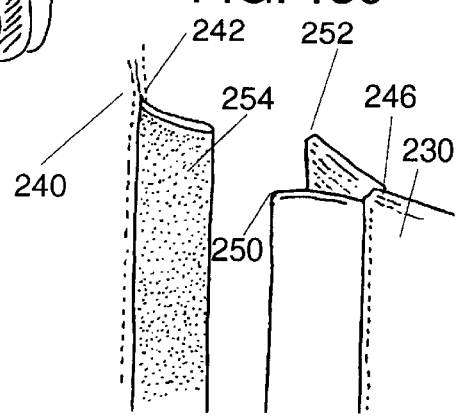
FIG. 15c shows the attachment mechanism for holding the fabric panel on the backpack.

Another feature of the instant invention is the reversible and removable noise reduction system. Walking through brush or trees can create loud noises as the foliage contacts the backpack material. The application of fabric panels to the major exterior surfaces of the backpack drastically reduces the noise from foliage contact. FIGS. 15a, 15b and 15c show an embodiment of the fabric panel 230 applied to the exterior of a backpack 232 to obtain the noise reduction benefit.

In FIG. 15a, a backpack 232 is shown having a main body 234 defining an internal cavity, shoulder straps 236, and waist band 238. The main body 234 has a rear surface 210 having opposing side edges 242, and which may include grommets or retainer 244 for holding a bungee cord attachment structure. A fabric panel 230 is applied to the rear surface 240, and is attached along its side edges 246 to the corresponding side edges 242 of the rear surface 240 of the backpack 232.

The fabric panel 230 can be made of any soft, non-snagging fabric, such as Polarfleece® fabric, manufactured by Malden Mills. The panel 230 has finished edges to avoid unraveling or other type of contact damage. The fabric panel 230 is releasably attached along the side edges 242 of the backpack. One such means to attach the panel 230 is by a sandwich of Velcro® fasteners, as shown in FIG. 15c. The fabric panel 230 defines two flaps 250, 252 extending along each vertical side edge 246, with the inner faces of each flap 250, 252 having a hook or loop Velcro® fastener portion attached thereto. The vertical edges 242 of the rear surface 240 of the backpack 232 each have a single flap 254 extending therefrom, preferably continuously, with the opposite hook or loop Velcro® fabric fastener portion attached to the opposite sides thereof. The two flaps 250, 252 on either edge 246 of the fabric panel 230 engage both sides of the single flap 254 on both edges 246 of the backpack 232 to securely position the fabric panel 230 on the backpack. The panel 230, so secured, is not difficult to accidentally remove from the backpack.

Figure 14B:
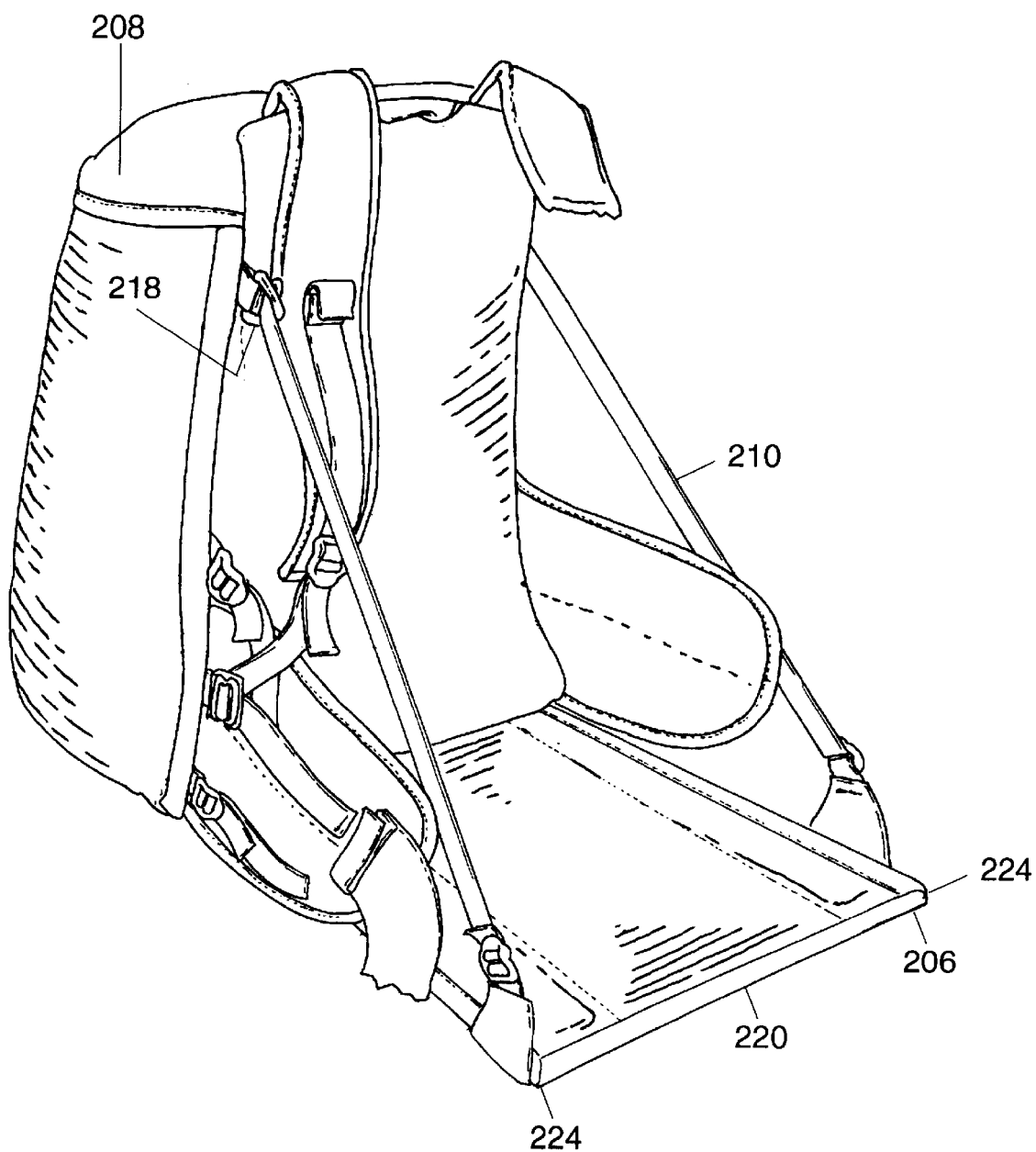
FIG. 14b shows a backpack having the panel extension of the present invention in the seat position, extending forwardly of the backpack.
Figure 14C:
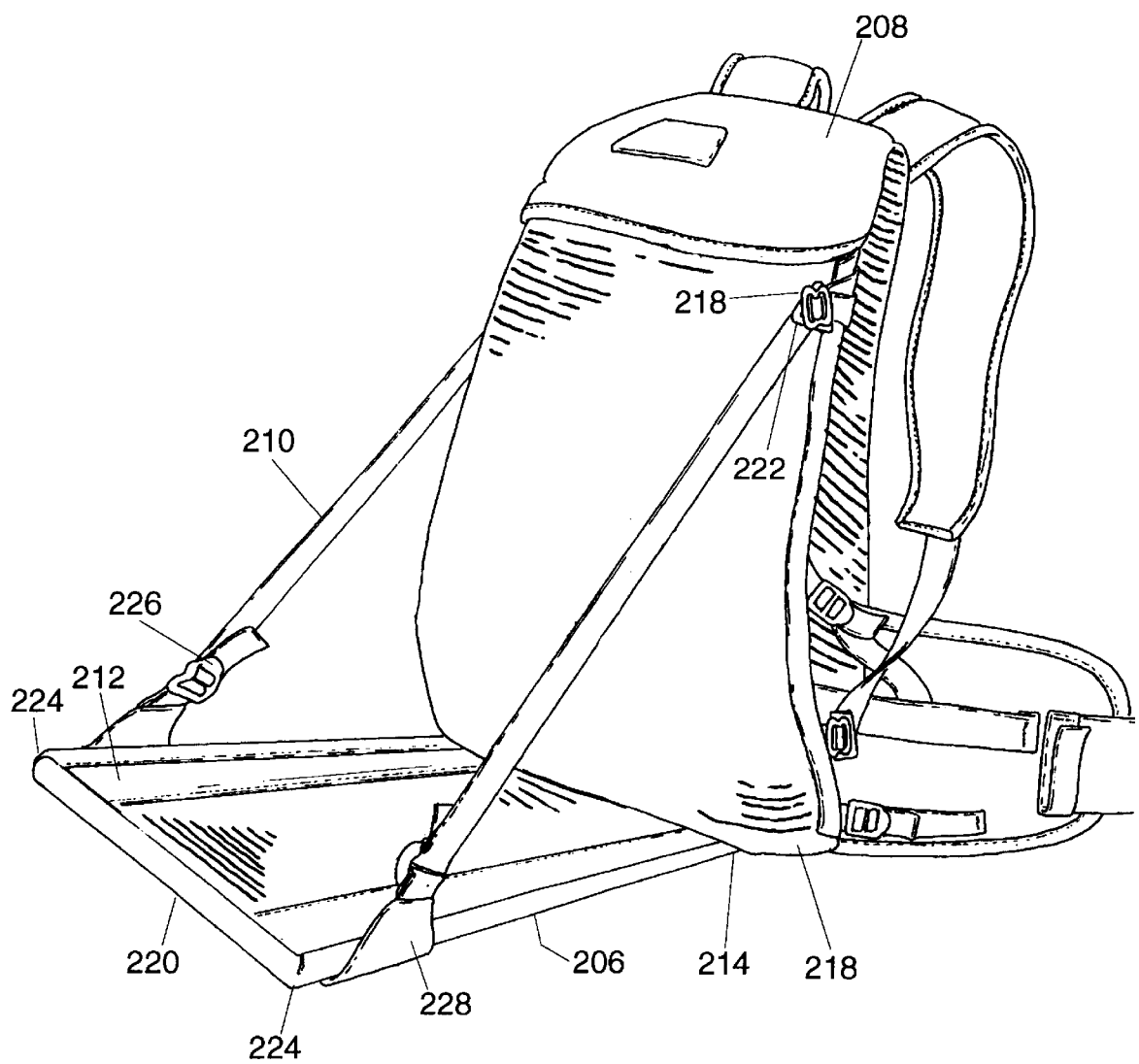
FIG. 14c shows a backpack having the panel extension of the present invention in the cargo carrying position, extending rearwardly of the backpack.

The fabric panel can have slits 256 formed therein, see FIG. 14b, to facilitate the positioning of the panel 230 over the grommets or other features on the rear surface 240 of the backpack 232 that are desired to be accessible when the fabric panel 230 is applied.

The fabric panel 230 is multi-functional. It not only reduces noise levels, but also can change the color and thus customize the backpack for different uses. The fabric panels can have different color combinations or designs on either side so that when reversed the panel converts from one desired color to the next. For instance, one side can be blaze orange, and the other camouflage. In addition, the fabric panel can be removed to expose a third color, which is the color of the backpack itself. Thus, the fabric panels both reduce noise generation and provide multi-functional color combinations.

While an example is provided for attaching the fabric panel 230 to the rear surface 240 of the backpack 232, a fabric panel 230 can be attached to any other surface of the backpack, including the top, sides, front and bottom, by similar means to obtain similar results.

Figure 16A:
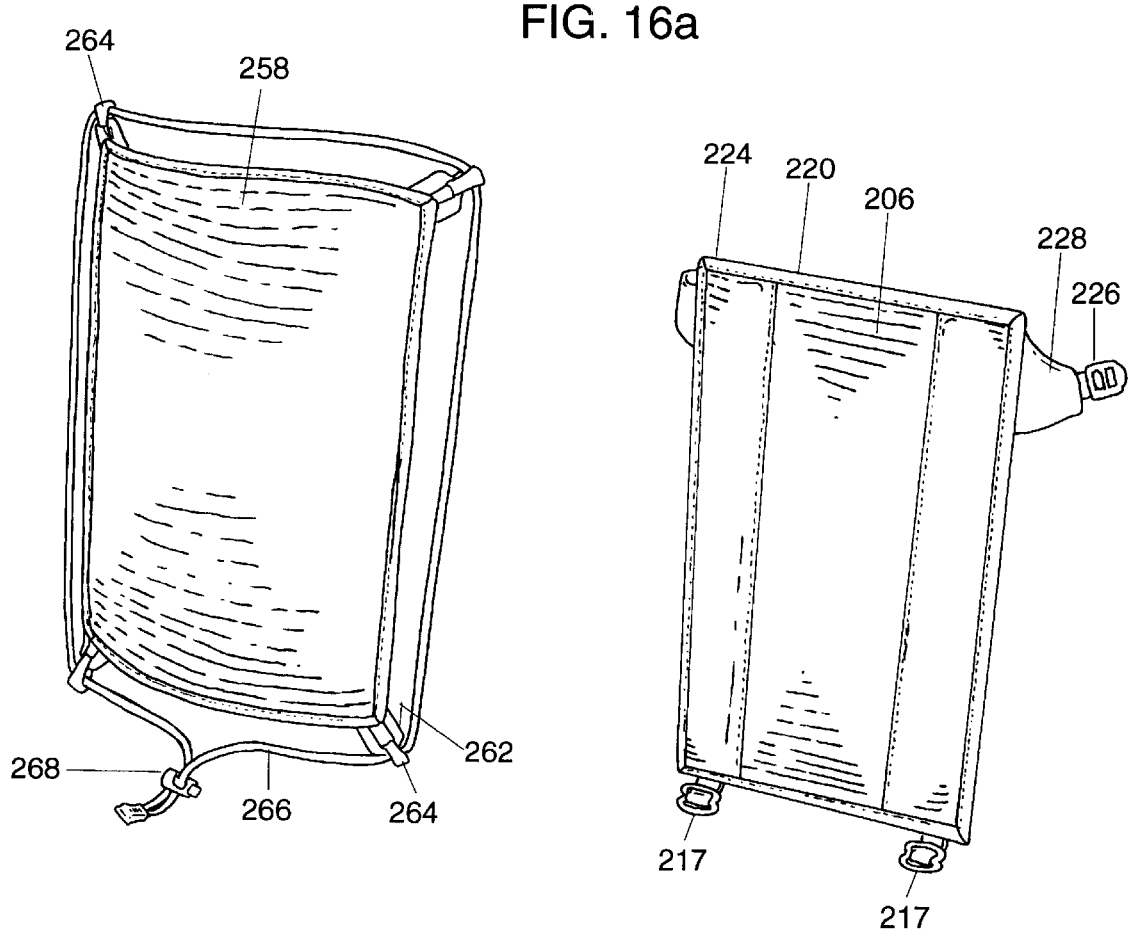
FIG. 16a shows a fabric panel for covering the panel extension of FIGS. 14a–c.
Figure 16B:
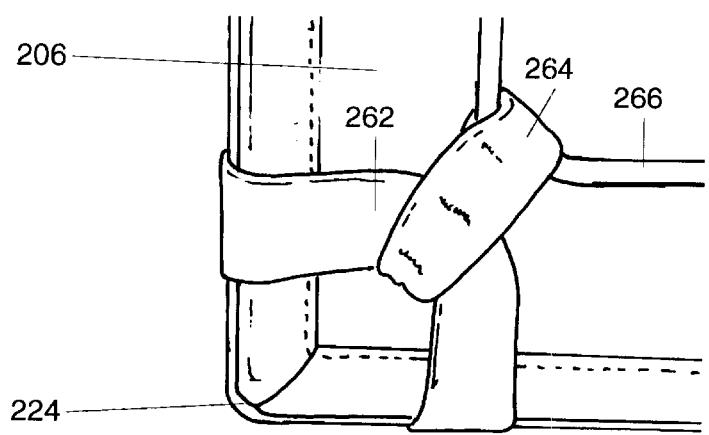

A fabric panel 258, as shown in FIGS. 16a and 16b, is a valuable noise reduction and color enhancement addition for use with the panel extension 206 as described above. The fabric panel 258 for use with the panel extension 206 includes a main body made of the fabric. The main body is shaped the substantially the same as the panel extension 206, and has a beading finish on its peripheral edges. The main body fabric can be one color on one side and an alternative color on the other. A loop member 262 is attached at each corner to secure an elastic cord guide 264. An adjustable length elastic cord 266 extends through each cord guide 264 around the perimeter of the fabric panel 258.

The fabric panel 258 is applied to the rear surface of the panel extension 206 using unique corner fasteners. See FIG. 16b. The loop members 262 at each corner of the fabric panel 258 extend over the corresponding corner 224 of the panel extension 206. This anchors and secures the position of the fabric panel 258 on the panel extension 206. This also positions the cord guides 264 inside the perimeter of the panel extension 206 on the opposite side (front side) of the panel extension 206 to which the fabric panel 258 is applied. When the elastic cord 266 is tightened using the adjustable fastener 268, the cord guides 264 are biased toward the center of the front side of the panel extension 206, and pull the loop members 262 taut around the corners 224 of the panel extension 206 to secure the fabric panel 258 in place. To remove the fabric panel 258 from the panel extension 206, the elastic cord 266 is loosened, and the loop members 262 are removed from the corners 224 of the panel extension 206.

When the panel extension 206 is in the collapsed mode, the fabric panel 258 is facing outwardly away from the backpack. The fabric panel 258 thus applied provides the color variations desired by the user, reduces noise generation cause by foliage contact, and also acts as a seat cushion when the panel extension is positioned to extend forwardly of the backpack.

Another accessory for use with the harness described above is a hand warmer pouch suspended between shoulder straps 44 of the harness 40. The hand warmer pouch 270 and the related attachment structure 272 are shown in FIGS. 17a, 17b, 17c and 17d. The hand warmer pouch 270 has a main body 274 defining a top edge 276, opposing side edges 278, and a bottom edge 280. The hand warmer pouch 270 defines an interior cargo space accessed through zippered openings 282 formed along both the top edge 276 on the front and back surfaces of the pouch 270. The dual zippers 282 allow ambidextrous access to the cargo space. A lined recess 284 is formed between the opposing side edges 278. Openings 286 are formed along the side edges 278 to allow access to the recess 284, which allows a user to position his hands in the recess. The hand warmer 270 preferably has an insulating material, such as fleece, lining the recess 284. A user can insert his or her hands into the recess 284 from opposite sides to meet inside the recess.

Figure 17A:
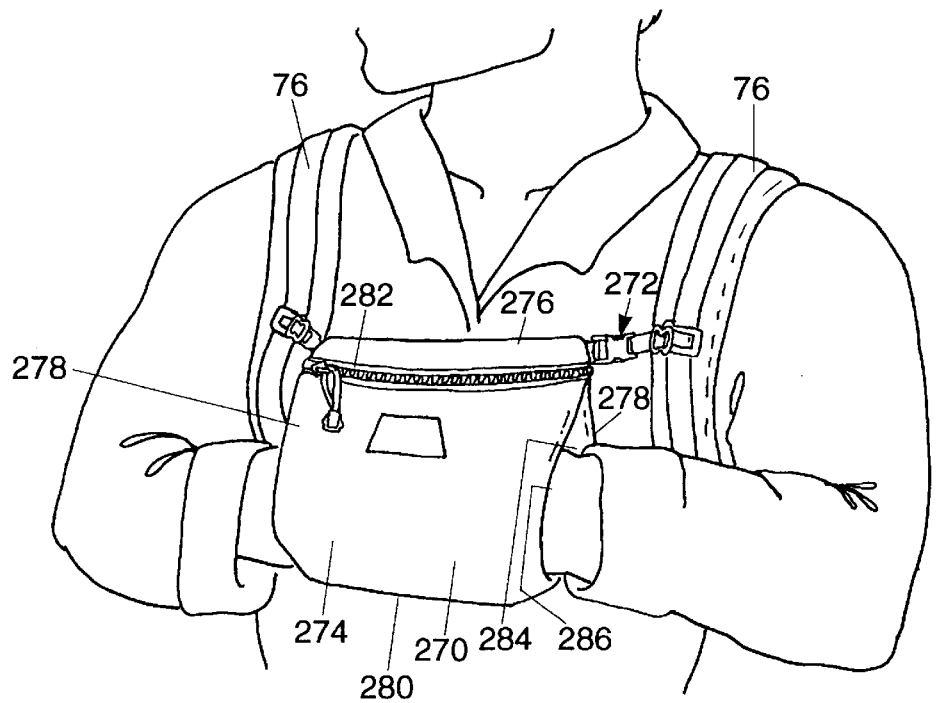
FIG. 17a shows the hand warmer feature of the present invention suspended between the shoulder straps of the harness shown in FIG. 1.
Figure 17B:
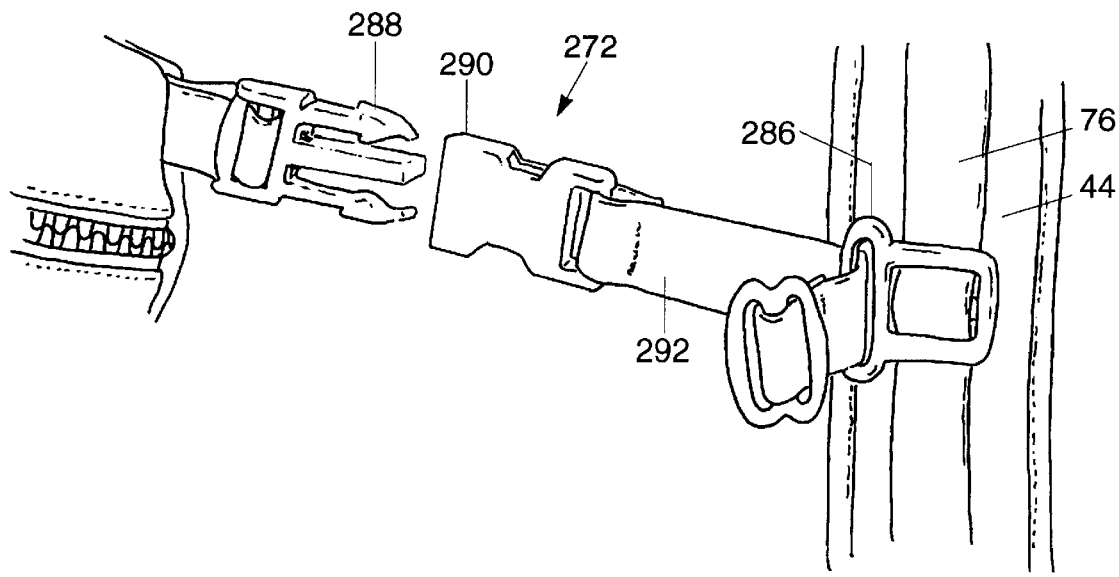
FIG. 17b shows the attachment mechanism for attaching the hand warmer to the shoulder strap.

The hand warmer pouch 270 is suspended between the shoulder straps 44 of the harness system 40. The mounting tracks 76 positioned on the shoulder straps 44 support an attachment structure 272, such as the three-bar fastener with an integrally-formed laterally inwardly extending common loop 286. The hand warmer 270 attaches to the inwardly extending common loops at either end. Fastening means, such as a male spring-loaded attachment insert 288, is attached to and extends outwardly from each top corner of the hand warmer pouch 270. A female receptor 290 is attached to a leash 292, which is attached to the common loop on the mounting track 76. The leash 292 is attached to a three-bar slider, which is inserted through the common loop, as described above with respect to FIG. 2b. Each male attachment 288 is releasably received in the corresponding female receptor 290 to suspend the hand warming pouch 270 between the shoulder straps 44, as shown in FIGS. 17a and 17b.

Figure 17C:
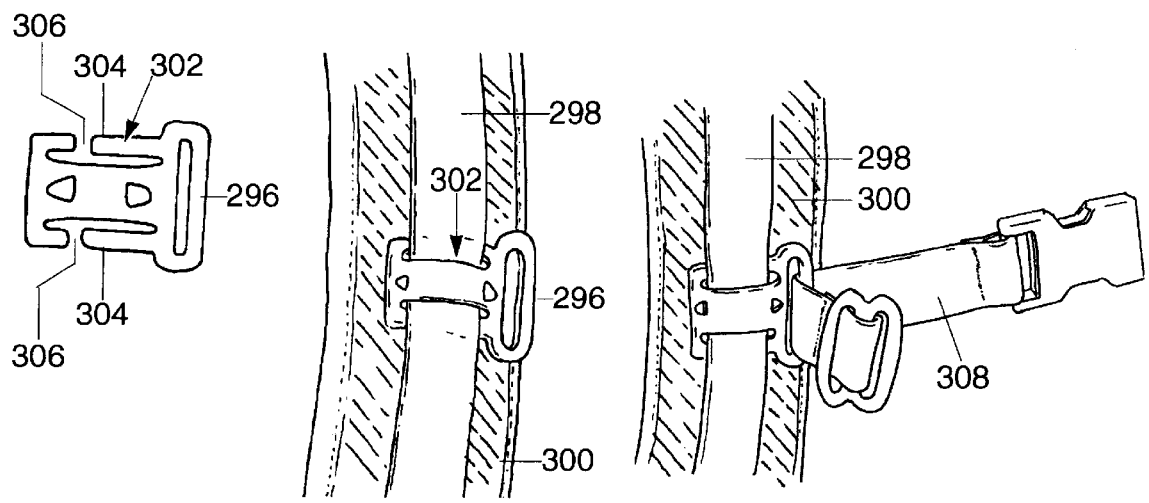
FIG. 17c shows one alternative to the attachment mechanism for the hand warmer attachment.

FIG. 17c shows an alternative attachment mechanism 294 for mounting the common loop 296 on the mounting track 298 in generic applications. Where the mounting track 298 is fixed to the shoulder strap 300 such that no three-bar slider can be inserted over the mounting track 298, a split three-bar slider 302 can be used to attach to the mounting track. In a split three-bar slider, the two outer bars 304 each define a slot 306 and are not continuous, thus allowing the mounting track 298 to be inserted through the slot 306 in the outer bars, as shown in FIG. 17c. The common loop 296 is integrally formed on the split three-bar slider 302 for attachment applications, such as the hand warmer pouch 270. The leash 308 is then attached to the common loop 296 on the split three-bar slider 302. This split three-bar slider 302 will also work on a "shoulder lift" strap found on some high-end backpacks.

Figure 17D:
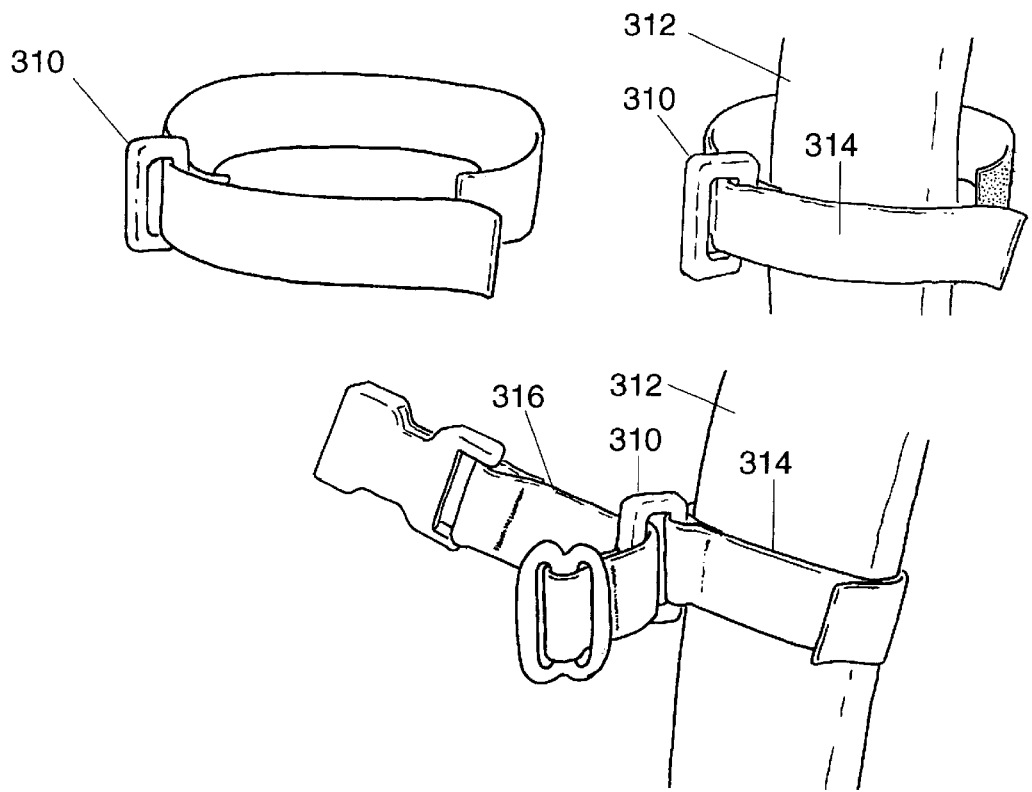
FIG. 17d shows another alternative to the attachment mechanism for the hand warmer attachment.

FIG. 17d shows the manner for attaching a common loop 310 to shoulder straps 312 to support the hand warmer pouch 270 when the shoulder straps 312 are generic and do not have a mounting track. In this instance, the common loop 310 is affixed to a length of flexible webbing 314 having Velcro® type hook and loop fastener thereon. The length of webbing material 314 is wrapped around the shoulder strap 312 and fastened to itself using the Velcro® fastener. This attaches the common loop 310 where desired to support the suspended hand warmer 270 between the shoulder straps 312. The leash 316 is then attached to the common loop 310 to support the hand warmer 270. The hand warmer 270 can be positioned at virtually any desired vertical location on the shoulder straps 312.

Figure 18:
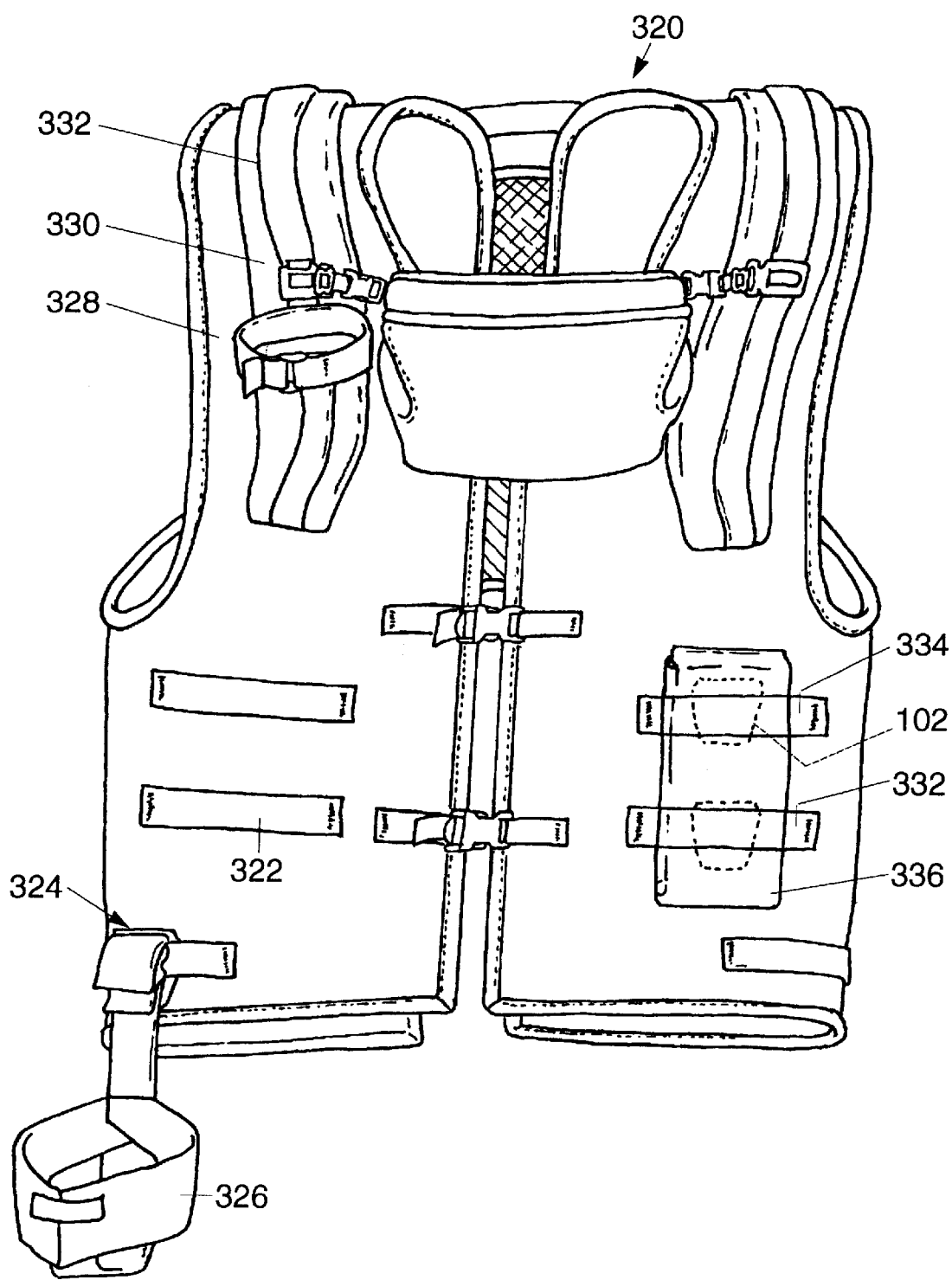
FIG. 18 shows a vest having a variety of the accessories of the present invention mounted thereupon.

FIG. 18 shows the application of many of the features of the present invention on a garment, such as a vest 320. The vest has a conventional main body defining a front right and left side portions. A mounting track 322 is attached to the bottom part of the right, generally over the hip of the user. A spatula system 324, as described above, is used to support the cradle 326 of the long gun support system from the mounting track 322. The barrel fastener 328, as described above with respect to the long gun support system 148, is attached to a three-bar slider 330 on mounting tracks 332 on the upper part of the right portion of the vest. A three-bar loop can be used, where no mounting tracks are present, as part of a three-bar loop/common loop connection structure. The long gun support system securely holds a firearm when implemented on a garment, such as a vest 320, in a similar manner to its use on a harness or backpack. The fly rod pouch (FIGS. 10a and 10b) and the spinning rod pouch (FIGS. 11a and 11b) can also be mounted on the mounting track using the spatula system.

A pair of vertically spaced mounting tracks 332, 334 are fixed to the left side portion of the vest to support the shell carrier 336 using the spatula support system 102, as shown in FIGS. 7a, 7b, and 7c. This is also shown in FIG. 18.

A hand warmer 338, as shown in FIGS. 17a–d, can also be mounted on a garment in the same manner as it is supported between the laterally spaced shoulder straps of a back pack or harness. The garment includes the proper attachment fasteners (such as common loops) formed thereon to support the fasteners shown in FIGS. 17b and 17d. The hand warmer 270 can thus serve to carry desired objects, as well as provide a place to warm one's hands, on a vest or other garment.

The instant invention, as described above, provides an integrated load bearing field support system. The field support system is based on the harness using the spatula mounting system, as well as the universally positioned attachment mechanisms to allow the attachment of a variety of articles to the field support system conveniently and securely. The variety of articles includes different pouches, a shell holder, long gun support system and the hand warmer. In addition, existing load bearing systems, such as backpacks, can also be used to support these articles provided the proper connection structure. The extension panel application for the load bearing field support system also provides added functionality. In addition, the noise reduction panels provide additional benefits to the system, including providing the desired camouflage, or high visibility, protection and noise reduction.

While the invention has been particularly shown and described with reference to a preferred embodiment thereof, it will be understood by those skilled in the art that various other changes in the form and details may be made without departing from the spirit and scope of the invention.

As merely one example, the nylon webbing length mounting tracks 52 may be replaced by any suitable flexible material and need not necessarily be a webbing material. A complementary hook or loop material may also be provided on the outer surface of the waist belt 42 beneath the tracks 52 to provide additional lateral support for attached articles to the tracks 52. These alternative constructions may also apply to the mounting tracks 76 on the shoulder straps 44.

A presently preferred embodiment of the present invention and many of its improvements have been described with a degree of particularity. It should be understood that this description has been made by way of example, and that the invention is defined by the scope of the following claims.

I claim:

1. A long gun support system for supporting firearm, the long gun support system comprising:

a waist belt;

a mounting track affixed to said waist belt;

at least one shoulder strap, at least one of said at least one shoulder straps having a front end attached to the waist belt and a rear end attached to the waist belt, and a middle section disposed between said front and rear ends and a mounting track is attached to said shoulder strap, and a three-bar slider is threaded on said mounting track; and a cradle defining a receptacle, said cradle supported on said mounting track affixed to said waist belt by an engagement member which attaches to said cradle, and wherein said engagement member inserts between said mounting track and said waist belt to releasably attach, in a selectively stationary position, said cradle to said waist belt;

a fastener attached to said at least one shoulder strap above said waist belt, and comprising a flexible main member having opposing ends with a flexible tail attached to said flexible main member, and said flexible tail being threaded through said three-bar slider to attach to the shoulder strap, wherein said cradle and said fastener support the firearm.

2. A long gun support system for supporting firearm, the long gun support system comprising:

a waist belt;

a mounting track affixed to said waist belt;

at least one shoulder strap, at least one of said at least one shoulder straps having a front end attached to the waist belt and a rear end attached to the waist belt, and a middle section disposed between said front and rear ends; and a cradle defining a receptacle, said cradle supported on said mounting track by an engagement member which attaches to said cradle, and wherein said engagement member inserts between said mounting track and said waist belt to releasably attach, in a selectively stationary position, said cradle to said waist belt;

said cradle comprising a support member attached to said engagement member by a ladder lock, wherein said ladder lock slidably attaches said support member to said engagement member to allow the position of said cradle to be adjusted in relation to the length of a long gun, opposing side members extending from said support member outwardly and forwardly to meet together forming a loop; and a bottom member extending from the support member downwardly and forwardly to attach to the opposing side members to form the cradle with the opposing side members and the support member;

a fastener attached to said at least one shoulder strap above said waist belt, wherein said cradle and said fastener support the firearm.

* * * * *